United States Patent
Tsai et al.

(10) Patent No.: US 12,143,580 B2
(45) Date of Patent: Nov. 12, 2024

(54) METHODS AND APPARATUSES OF PROCESSING VIDEO PICTURES WITH PARTITION CONSTRAINTS IN A VIDEO CODING SYSTEM

(71) Applicant: MEDIATEK INC., Hsinchu (TW)

(72) Inventors: Chia-Ming Tsai, Hsinchu (TW); Chih-Wei Hsu, Hsinchu (TW); Ching-Yeh Chen, Hsinchu (TW); Tzu-Der Chuang, Hsinchu (TW); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 68 days.

(21) Appl. No.: 17/260,008

(22) PCT Filed: Jul. 12, 2019

(86) PCT No.: PCT/CN2019/095855
§ 371 (c)(1),
(2) Date: Jan. 13, 2021

(87) PCT Pub. No.: WO2020/015592
PCT Pub. Date: Jan. 23, 2020

(65) Prior Publication Data
US 2021/0329233 A1 Oct. 21, 2021

Related U.S. Application Data

(60) Provisional application No. 62/754,714, filed on Nov. 2, 2018, provisional application No. 62/744,701, filed on
(Continued)

(51) Int. Cl.
| | |
|---|---|
| H04N 19/119 | (2014.01) |
| H04N 19/176 | (2014.01) |
| H04N 19/186 | (2014.01) |
| H04N 19/436 | (2014.01) |
| H04N 19/70 | (2014.01) |
| H04N 19/96 | (2014.01) |
| H04N 19/174 | (2014.01) |

(52) U.S. Cl.
CPC ......... *H04N 19/119* (2014.11); *H04N 19/176* (2014.11); *H04N 19/186* (2014.11);
(Continued)

(58) Field of Classification Search
CPC ... H04N 19/174; H04N 19/119; H04N 19/176
See application file for complete search history.

(56) References Cited

U.S. PATENT DOCUMENTS

| | | |
|---|---|---|
| 10,230,961 B2 | 3/2019 | Liu et al. |
| 10,334,281 B2 | 6/2019 | Zhang et al. |

(Continued)

FOREIGN PATENT DOCUMENTS

| | | |
|---|---|---|
| CN | 103796032 A | 5/2014 |
| CN | 107836117 A | 3/2018 |

(Continued)

OTHER PUBLICATIONS

International Search Report and Written Opinion mailed Aug. 27, 2019, issued in application No. PCT/CN2019/095855.
(Continued)

*Primary Examiner* — Zhubing Ren
(74) *Attorney, Agent, or Firm* — McClure, Qualey & Rodack, LLP

(57) ABSTRACT

Video processing methods and apparatuses in a video encoding or decoding system for processing a video picture partitioned into blocks with one or more partition constraints. The video encoding or decoding system receives input data of a current block and checks whether a predefined splitting type is allowed to partition the current block according to first and second constraints. The first constraint restricts each sub-block partitioned from the current block to be completely contained in one pipeline unit, and the second constraint restricts each sub-block partitioned from the current block to contain one or more
(Continued)

complete pipeline units. The pipeline units are non-overlapping units in the video picture designed for pipeline processing. The current block is not partitioned by the predefined splitting type if any sub-block partitioned by the predefined splitting type violates both the first and second constraints. The system encodes or decodes the current block.

14 Claims, 15 Drawing Sheets

Related U.S. Application Data on Oct. 12, 2018, provisional application No. 62/727,052, filed on Sep. 5, 2018, provisional application No. 62/725,314, filed on Aug. 31, 2018, provisional application No. 62/698,173, filed on Jul. 15, 2018, provisional application No. 62/698,114, filed on Jul. 14, 2018.

(52) U.S. Cl.
CPC ............ H04N 19/436 (2014.11); H04N 19/70 (2014.11); H04N 19/96 (2014.11); *H04N 19/174* (2014.11)

(56) References Cited

U.S. PATENT DOCUMENTS

| | | | |
|---|---|---|---|
| 10,779,004 | B2 | 9/2020 | Huang et al. |
| 2002/0061143 | A1 | 5/2002 | Konoshima |
| 2017/0353730 | A1* | 12/2017 | Liu .................... H04N 19/96 |
| 2018/0070110 | A1* | 3/2018 | Chuang ............... H04N 19/463 |
| 2018/0109812 | A1* | 4/2018 | Tsai .................... H04N 19/157 |
| 2018/0213264 | A1* | 7/2018 | Zhang .................. H04N 19/96 |
| 2018/0352226 | A1* | 12/2018 | An ...................... H04N 19/12 |
| 2020/0221140 | A1* | 7/2020 | Zhao .................... H04N 19/14 |
| 2020/0366893 | A1* | 11/2020 | Leleannec ............ H04N 19/119 |
| 2021/0014492 | A1* | 1/2021 | Wang ................... H04N 19/167 |
| 2021/0203929 | A1* | 7/2021 | Leleannec ............ H04N 19/159 |

FOREIGN PATENT DOCUMENTS

| | | |
|---|---|---|
| CN | 107948661 A | 4/2018 |
| TW | 201804805 A | 2/2018 |
| WO | 2017/088093 A1 | 6/2017 |
| WO | 2017/088170 A1 | 6/2017 |

OTHER PUBLICATIONS

Chinese language office action dated May 11, 2020, issued in application No. TW 108124874.
Extended European Search Report dated Jun. 17, 2022, issued in application No. EP 19837502.4.
Hsu, C., et al.; "CE1-related: Constraint for binary and ternary partitions;" Joint Video Experts Team (JVET) of ITU-T SG 16 WP 3 and ISO/IEC JTC 1/SC 29/WG 11; Jul. 2018; pp. 1-3.
Chen, J., et al.; "Algorithm description for Versatile Video Coding and Test Model 1 (VTM 1);" Joint Video Experts Team (JVET) of ITU-T SG 16 WP 3 and ISO/IEC JTC 1/SC 29/WG 11; Jun. 2018; pp. 1-10.
Chinese language office action dated Apr. 6, 2022, issued in application No. CN 201980045882.4.

* cited by examiner

METHODS AND APPARATUSES OF PROCESSING VIDEO PICTURES WITH PARTITION CONSTRAINTS IN A VIDEO CODING SYSTEM

CROSS REFERENCE TO RELATED APPLICATIONS

The present invention claims priority to U.S. Provisional Patent Application Ser. No. 62/698,114, filed on Jul. 14, 2018, entitled "Pipeline Unit Constraints on BT and TT", U.S. Provisional Patent Application Ser. No. 62/698,173, filed on Jul. 15, 2018, entitled "Pipeline Unit Constraints on Binary Tree and Ternary Tree", U.S. Provisional Patent Application Ser. No. 62/725,314, filed on Aug. 31, 2018, entitled "Pipeline Unit Constraints on Binary Tree and Ternary Tree", U.S. Provisional Patent Application Ser. No. 62/727,052, filed on Sep. 5, 2018, entitled "Pipeline Unit Constraints on Binary Tree and Ternary Tree", U.S. Provisional Patent Application Ser. No. 62/744,701, filed on Oct. 12, 2018, entitled "Pipeline Unit Constraints on Binary Tree and Ternary Tree", and U.S. Provisional Patent Application Ser. No. 62/754,714, filed on Nov. 2, 2018, entitled "Pipeline Unit Constraints on Binary Tree and Ternary Tree". The U.S. Provisional patent applications are hereby incorporated by reference in their entireties.

FIELD OF THE INVENTION

The present invention relates to video processing methods and apparatuses that encode or decode video pictures in a video coding system with a partition constrain. In particular, the present invention relates to determining the validity of one or more splitting types for a block based on the partition constraint and partitioning the block by a valid splitting type.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which splits each video picture into multiple non-overlapped square Coding Tree Units (CTUs), also called Largest Coding Units (LCUs). Each individual CTU in a video picture or a slice is processed in a raster scanning order. In the HEVC main profile, the maximum and the minimum sizes of a CTU are specified by syntax elements signaled in the Sequence Parameter Set (SPS). Each CTU is further recursively partitioned into one or more non-overlapped Coding Units (CUs) using a quadtree (QT) splitting structure in order to adapt to various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure is illustrated in FIG. 1, where the solid lines indicate CU boundaries in the CTU 10.

Once the CTUs are partitioned into leaf CUs, each leaf CU is subject to further split into one or more Prediction Units (PUs) according to a PU splitting type for prediction. Unlike the recursive quadtree splitting for CUs, each leaf CU may only be split once to form multiple PUs. The PU works as a basic representative block for sharing prediction information as the same prediction process is applied to all pixels in the PU. The prediction information is conveyed to the decoder on a PU basis. After obtaining residual data generated by the prediction process based on the PU splitting type, the residual data belonging to a leaf CU is partitioned into one or more Transform Units (TUs) according to another quadtree splitting structure for transforming the residual data into transform coefficients for compact data representation. The dashed lines in FIG. 1 indicate TU boundaries in the CTU 100. The TU is a basic representative block for applying transform and quantization on the residual data or transform coefficients. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional (2-D) sample array of one color component associated with the CTU, CU, PU, and TU respectively. For example, a CTU consists of one luminance (luma) CTB, two chrominances (chroma) CTBs, and its associated syntax elements. A similar relationship is valid for CU, PU, and TU. In the HEVC system, the same quadtree splitting structure is generally applied to both luma and chroma components unless a minimum size for the chroma block is reached.

Binary-tree (BT) splitting structure is an alternative structure to the quadtree splitting structure which recursively divides a block into two smaller blocks. Joint Video Exploration Team (JVET) of ITU-T SG16 WP3 and ISO/IEC JTC1/SC29/WG11 are currently in the process of exploring the next-generation video coding standard called Versatile Video Coding (VVC). Some promising new coding tools have been adopted into Joint Exploration Model (JEM) for further investigation. A new splitting structure called QuadTree plus Binary Tree (QTBT) structure balances the coding efficiency and the coding complexity of the quadtree splitting structure and the binary-tree splitting structure. An exemplary QTBT structure is shown in FIG. 2A, where a CTU is firstly partitioned by a quadtree structure then a binary-tree splitting structure. The CUs can be recursively partitioned by quadtree splitting until a current CU size reaches a minimum allowed quadtree leaf node size. Each leaf quadtree block may be partitioned by binary-tree splitting if the leaf quadtree block size is not larger than a maximum allowed binary-tree root node size. The binary-tree splitting may be recursively applied until the current CU size, width, or height reaches a minimum allowed binary-tree leaf node size, width, or height or the binary-tree depth reaches a maximum allowed binary-tree depth. Only horizontal symmetrical splitting and vertical symmetrical splitting are the two allowed binary-tree splitting types in QTBT splitting. The resulting leaf CUs from QTBT splitting may be employed for prediction and transform processing without any further partitioning.

FIG. 2A illustrates an example of block partitioning structure according to the QTBT splitting structure and FIG. 2B illustrates a corresponding coding tree diagram for the QTBT splitting structure shown in FIG. 2A. The solid lines in FIGS. 2A and 2B indicate quadtree splitting while the dashed lines indicate binary-tree splitting. In each splitting node (i.e., non-leaf) of the binary-tree structure, one flag indicates which splitting type is used, 0 indicates horizontal symmetrical splitting and 1 indicates vertical symmetrical splitting. For CTUs coded in I-type slices, the QTBT coding tree representation for chroma CTBs may be different from the QTBT coding tree representation for a corresponding luma CTB. For CTUs coded in P-type and B-type slice, the same QTBT coding tree representation is applied to both chroma CTBs and luma CTB. In the QTBT splitting structure, the minimum allowed quadtree leaf node size, the maximum allowed binary-tree root node size, the minimum allowed binary-tree leaf node width and height, and the maximum allowed binary-tree depth and height are indicated in the high level syntax such as in the SPS.

Multi-Type-Tree (MTT) splitting structure extends the concept of the two-level tree structure in the QTBT splitting structure by allowing both Binary-Tree (BT) splitting and Ternary-Tree (TT) splitting in the second level of the MTT splitting structure. A CTU is first partitioned by quadtree splitting, and quadtree leaf nodes are further partitioned by a sub-tree structure. The sub-tree structure may contain both binary-tree splitting and ternary-tree splitting. For example, each quadtree leaf node may be further divided by BT or TT splitting. A block partitioned by BT or TT splitting may be further split with another BT or TT splitting until a maximum depth or a minimum size is reached. A sub-tree leaf node is a Coding Unit (CU) for prediction and transform and will not be further split. FIG. 3 illustrates five splitting types used in the MTT splitting structure, where the splitting types include quadtree splitting type 30, binary-tree splitting types 32 and 34, and ternary-tree splitting types 36 and 38. The vertical center-side ternary-tree splitting type 36 and horizontal center-side ternary-tree splitting type 38 divide a block into three smaller blocks, all having reduced sizes in one spatial dimension while keeping the same size in the other spatial dimension.

BRIEF SUMMARY OF THE INVENTION

Methods and apparatuses of video processing in a video coding system for encoding or decoding video pictures with a partition constraint comprise receiving input data associated with a current block in a current video picture, determining a pipeline unit size of pipeline units, determining whether a predefined splitting type is allowed to partition the current block into multiple sub-blocks according to the partition constraint, partitioning the current block by one allowed splitting type, and encoding or decoding the current block according to a block partitioning structure of the current block. The pipeline units are non-overlapping units in the current video picture designed for pipeline processing, and an example of the pipeline unit size is set to a maximum Transform Block (TB) size. The pipeline unit size may be implicitly defined based on a profile or level according to a video compression standard. In one example, the pipeline unit size is 64×64 for a luminance (luma) component or 32×32 for chrominance (chroma) components in a 4:2:0 color format. The first constraint restricts each of the sub-blocks partitioned from the current block to be completely contained in one pipeline unit, and the second constraint restricts each of the sub-blocks partitioned from the current block to contain one or more complete pipeline unit. The predefined splitting type is prohibited to be used to split the current block if any sub-block partitioned by the predefined splitting type violates both the first and second constraints. The predefined splitting type may be selected from quadtree splitting, horizontal binary-tree splitting, vertical binary-tree splitting, horizontal ternary-tree splitting, and vertical ternary-tree splitting. The current block may be a CTU, a CU, or a TU. Some embodiments of the video processing methods and apparatuses further considers a re-visit constraint, where the re-visit constraint prohibits re-visiting any pipeline unit in the current block after leaving the pipeline unit when processing the sub-blocks partitioned from the current block by the pre-defined splitting type. The predefined splitting type is not allowed to partition the current block if the re-visit constraint is violated.

Some embodiments of the video processing methods and apparatuses allow non-square pipeline units, and in one embodiment, multiple allowable pipeline unit sizes of the pipeline units are defined by a pipeline unit area. For example, the pipeline unit area is 4096, so the allowable pipeline unit sizes are 64×64, 128×32, and 32×128. The usage of the non-square pipeline units is predefined, derived, or signaled in a sequence, picture, slice, tile, CTU, or CTU row level according to various embodiments.

A variation of the methods and apparatuses of video processing in a video coding system determines a block partition structure for each block according to a partition constraint based on two thresholds. The video processing methods comprise receiving input data associated with a current block in a current video picture, determining whether a predefined splitting type is allowed for partitioning the current block into multiple sub-blocks by comparing a width of the current block, a height of the current block, or both the width and height of the current block with one or both threshold W and threshold H, partitioning the current block with one allowed splitting type, and encoding or decoding the current block according to a block partitioning structure of the current block. The thresholds W and H are positive integers and are predefined or implicitly defined based on a profile or level according to a video compression standard. The predefined splitting type may be selected from horizontal binary-tree splitting, vertical binary-tree splitting, horizontal ternary-tree splitting and vertical ternary-tree splitting. In one embodiment, horizontal binary-tree splitting is not allowed if the width of the current block is larger than W and the height of the current block is less than or equal to H, vertical binary-tree splitting is not allowed if the width is less than or equal to W and the height is larger than H. In an embodiment, horizontal ternary-tree splitting is not allowed if the width is larger than W, and vertical ternary-tree splitting is not allowed if the height is larger than H. In another embodiment, horizontal ternary-tree splitting is not allowed if the width is larger than or equal to W and the height divide by 4 is smaller than H, and vertical ternary-tree splitting is not allowed if the height is larger than or equal to H and the width divide by 4 is smaller than W. In another embodiment, horizontal ternary-tree splitting is not allowed if the width is larger than W and the height is larger than H but the height divide by 4 is smaller than H, and vertical ternary-tree splitting is not allowed if the height is larger than H and the width is larger than W but the width divide by 4 is smaller than W. In another embodiment, horizontal ternary-tree splitting is not allowed if the width is larger than or equal to W and the height is larger than H but the height divide by 4 is smaller than H, and vertical ternary-tree splitting is not allowed if the height is larger than or equal to H and the width is larger than W but the width divide by 4 is smaller than W. In yet another embodiment, horizontal ternary-tree splitting is not allowed if the width is larger than W and the height is larger than H and the height divide by 4 is not a multiple of H, and vertical ternary-tree splitting is not allowed if the height is larger than H and the width is larger than W but the width divide by 4 is not a multiple of W.

In some embodiments, a pipeline unit is defined to have a width equal to W and a height equal to H, and a pipeline unit size is a product of W and H. In an embodiment, ternary-tree splitting is not allowed if a size of the current block is twice as large as the pipeline unit size. In another embodiment, when a size of the current block is twice as large as the pipeline unit size, ternary-tree splitting is not allowed unless all further splitting directions are the same and a center sub-block of the current block is partitioned by binary-tree splitting. In another embodiment, the predefined splitting type is allowed if a size of the current block is four times as large as the pipeline unit size or if the size of the current block is smaller than the pipeline unit size, where the predefined splitting type is selected from quadtree, binary-tree, and ternary-tree splitting.

Some embodiments of the video processing methods and apparatuses also consider a re-visit constraint as the predefined splitting type is not allowed if the re-visit constraint is violated. The re-visit constraint prohibits re-visiting any pipeline unit in the current block after leaving the pipeline unit when processing the sub-blocks partitioned by the predefined splitting type from the current block.

Aspects of the disclosure further provide an apparatus implemented in a video encoding system or a video decoding system, and the apparatus partitions a current block into multiple sub-blocks with a partition constraint. An embodiment of the apparatus is implemented in a block partitioning module of the video encoding or decoding system to determine whether one or more predefined splitting type are allowed according to first and second constraints. The predefined splitting type is not allowed to split the current block if any sub-block partitioned by the predefined splitting type violates both the first and second constraints. Another embodiment of the apparatus determines whether one or more predefined splitting types are allowed according to two thresholds.

Aspects of the disclosure further provide a non-transitory computer readable medium storing program instructions for causing a processing circuit of an apparatus to perform video coding process to encode or decode a current block with a partition constraint. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
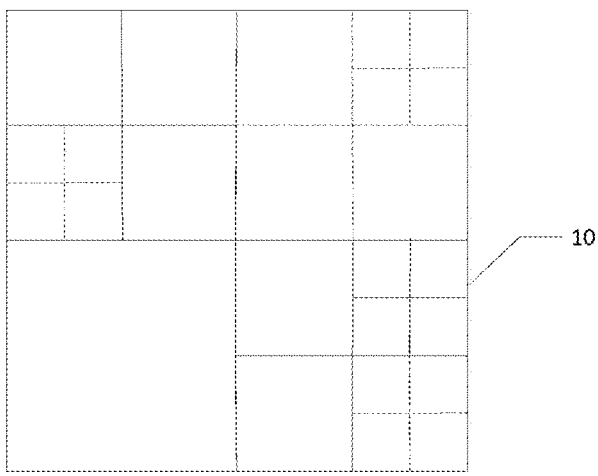
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2A:
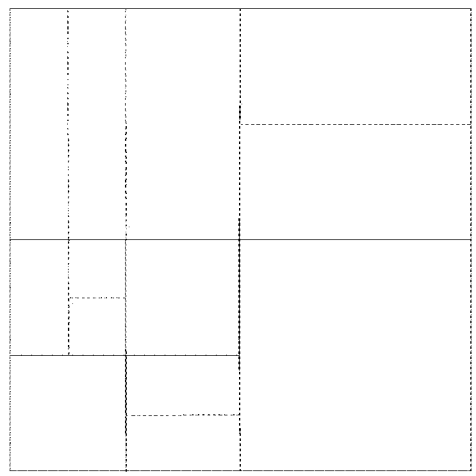
FIG. 2A illustrates an exemplary block partitioning structure according to a QuadTree plus Binary Tree (QTBT) splitting structure.
Figure 2B:
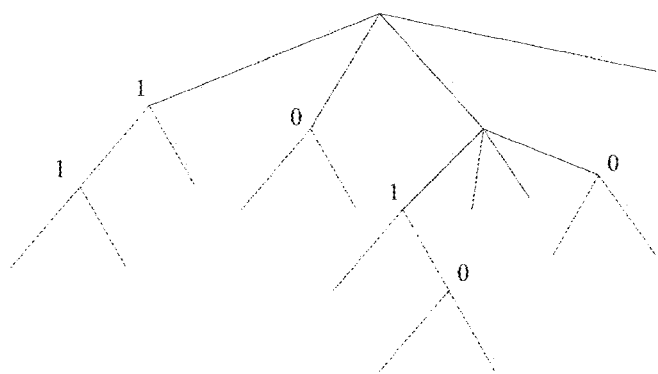
FIG. 2B illustrates a coding tree structure corresponding to the QTBT splitting structure of FIG. 2A.
Figure 3:
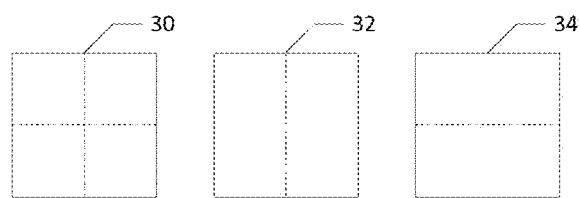
FIG. 3 illustrates five splitting types used in an exemplary Multi-Type Tree (MTT) splitting structure.
Figure 3:
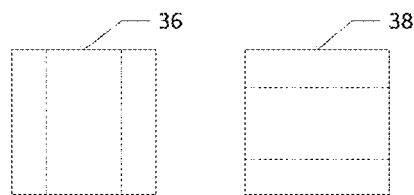

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

A Virtual Pipeline Data Unit (VPDU) is defined as a basic unit for pipeline processing, and the VPDU is also called a pipeline unit in the following description. By dividing a video picture into multiple non-overlapping VPDUs for pipeline processing, successive VPDUs may be processed by multiple pipeline stages at the same time. A VPDU is either a square unit, for example, each VPDU contains M×M luma pixels or N×N chroma pixels, or a VPDU is a non-square unit. The dimension of a VPDU may be defined by an area, such as 4096 pixels, or a size, such as 64×64. In hardware decoders, each VPDU is processed by one pipeline stage after another pipeline stage until each VPDU is processed by all the pipeline stages of video decoding. Different pipeline stages in the hardware decoder process different VDPUs simultaneously. Restricting a VPDU size to be within a size limit is a critical design issue in hardware implementation as the VPDU size is roughly proportional to the buffer size in most of the pipeline stages. An embodiment of the VPDU size is set to equal to the maximum Transform Block (TB) size, which is 32×32 luma pixels or 16×16 chroma pixels for HEVC hardware decoders. However, the maximum TB size is expected to be enlarged in the next-generation video coding standard as expending the maximum TB size improves the overall coding efficiency. For example, the maximum TB size for luma is expanding from 32×32 to 64×64 and the maximum TB size for chroma is expanding from 16×16 to 32×32 in a 4:2:0 color format. The VPDU size of the next-generation video coding standard is therefore enlarged to 64×64 for luma or 32×32 for chroma when the color format is 4:2:0, which is four times larger than the VPDU size required by the HEVC standard. Comparing to the HEVC standard which only employs quadtree splitting, partitioning CTUs with quadtree, binary-tree, and ternary-tree splitting achieves additional coding gains. When a 128×128 CTU is partitioned by binary-tree splitting or ternary-tree splitting, the required VPDU size is increased to 128×128 luma pixels or 64×64 chroma pixels. In comparison to the HEVC standard, the VPDU size is now 16 times larger, which dramatically increases the required buffer size for each pipeline stage in video processing.

In order to reduce the required VPDU size in the next-generation video coding standard, some embodiments of the present invention set a partition constraint to restrict one or more predefined splitting types to be applied to a current block according to a relationship between the current block and one or more corresponding pipeline units. Some other embodiments set a partition constraint to restrict one or more predefined splitting types to be applied to a current block according to one or both of the width and height of the current block. The current block may be a CTU, a CU, or a TU. A video picture to be encoded or decoded is divided into non-overlapping CTUs and each CTU contains one or more pipeline units for pipeline processing. An embodiment of the pipeline unit has a size equal to a maximum transform block size. In another embodiment, the pipeline unit size is explicitly signaled at sequence level, picture level, slice level, or block level. In yet another embodiment, the pipeline unit size is implicitly defined based on a profile or level according to the corresponding video compression standard.

First Constraint: Each Pipeline Unit Contains Complete one or more Sub-blocks A first constraint is an embodiment of the partition constraint which restricts one or more predefined splitting type to be applied to a current block according to a relationship between the current block and one or more corresponding pipeline units. The current block is a CTU, a CU, or a TU, and the current block may be further partitioned, for example, if the current block is a CU, the partition depth of the CU is less than a maximum allowed CU depth, similarly, if the current block is a TU, the partition depth of the TU is less than a maximum allowed TU depth. In another example, the current block is larger than a minimum allowed CU size if it is a CU or larger than a minimum allowed TU size if it is a TU. The first constraint restricts each pipeline unit to contain complete quadtree, binary-tree, or ternary-tree block partitions. The block partitions are sub-blocks partitioned from a current block by quadtree, binary-tree, or ternary-tree splitting, and the block partition may be CUs or TUs. In other words, the first constraint restricts each sub-block partitioned from a current block to be completely contained in one pipeline unit. For example, a pipeline unit contains one or more CUs after a splitting operation, and these CUs have to be completely inside the pipeline unit. During sub-tree partition, all samples in a sub-block partitioned from a current block by quad-tree, binary-tree, or ternary-tree splitting with a size smaller than or equal to a pipeline unit should be in the same pipeline unit. According to the first constraint, any of quadtree splitting, binary-tree splitting, and ternary-tree splitting is allowed to partition a current block when the current block is equal to or smaller than a pipeline unit and the current block is within one pipeline unit, because all sub-blocks partitioned from the current block are still included in the same pipeline unit. In an exemplary embodiment of the first constraint, when a size of a current block to be partitioned by quadtree splitting, binary-tree splitting, or ternary-tree splitting is larger than a size of a pipeline unit, a video encoder or decoder checks if all samples in each sub-block partitioned from the current block are in the same pipeline unit after the sub-tree partition operation, and this sub-tree partition operation is only allowed when all the samples in each sub-block are in the same pipeline unit. The pipeline unit contains one or more complete TUs after a splitting operation according to another example of the first constraint.

By complying with the first constraint of containing complete CUs or TUs in a pipeline unit, pipeline unit boundaries are also CU boundaries or TU boundaries. In other words, CUs or TUs cannot across pipeline unit boundary, and each segment of the pipeline unit boundary must also belong to a CU boundary or TU boundary. The pipeline unit boundary must align with either CU boundaries or TU boundaries according to the first constraint.

Second Constraint: Each Sub-block Contains Complete one or more Pipeline Units A second constraint is another embodiment of the partition constraint which restricts one or more predefined splitting type to be applied to a current block according to a relationship between the current block and one or more corresponding pipeline units. The current block is a CTU, a CU, or a TU that could be further partitioned. For example, if the current block is a CU, the partition depth of the CU is less than a maximum allowed CU depth or the size of the CU is larger than a minimum allowed CU size, similarly, if the current block is a TU, the partition depth of the TU is less than a maximum allowed TU depth or the size of the TU is larger than a minimum allowed TU size. The second constraint restricts each quadtree, binary-tree, or ternary-tree block partition to contain complete pipeline units. The block partitions are sub-blocks partitioned from a current block by quadtree, binary-tree, or ternary-tree splitting, and a block partition may be a CU or a TU. For example, when a CU contains one or more pipeline units after a sub-tree partition operation, these pipeline units are completely inside the CU. Quadtree splitting, binary-tree splitting, or ternary-tree splitting is only allowed to partition a current block when each of the sub-blocks resulted from the splitting operation still includes one or more complete pipeline units. In an embodiment of the second constraint, all samples in one pipeline unit are included in the same sub-block partitioned by quadtree splitting, binary-tree splitting, or ternary-tree splitting with a size greater than or equal to the pipeline unit.

Figure 4:
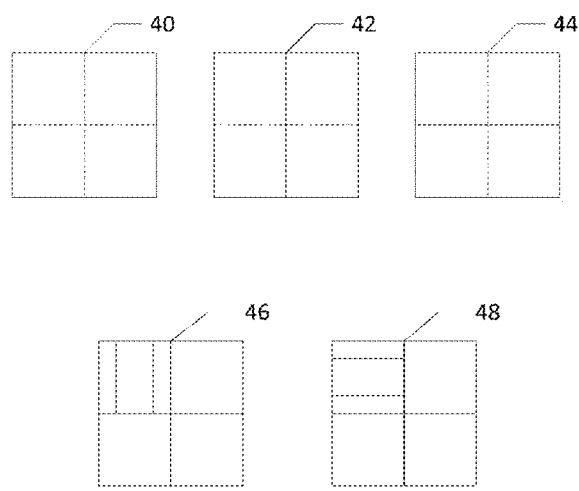
FIG. 4 illustrates some exemplary block partitioning structures of a CTU satisfying the partition constraint when square Virtual Pipeline Data Units (VPDUs) are used to process CUs in each CTU according to embodiments of the present invention.

Partition Constraint Employs First and Second Constraints For each CU partitioned from a CTU by a predefined splitting type, one of the previously described first and second constraints has to be met. A predefined splitting type is not allowed to partition a current block if any sub-block partitioned from the current block by the predefined splitting type violates both the first and second constraints. For example, either one or more CUs are completely contained in a pipeline unit or one or more pipeline units are completely contained in one CU, where each CU is partitioned from a CTU by quadtree splitting, binary-tree splitting, or ternary-tree splitting FIG. 4 illustrates some examples of valid binary-tree splitting or ternary-tree splitting under the restriction of the partition constraint. In this embodiment, square VPDUs are used to process the CUs partitioned from CTUs 40, 42, 44, 46, and 48 as shown in FIG. 4. Each CTU has a size of 128×128 and each of the square VPDUs indicated by dashed lines has a size of 64×64. CTU 40 is not partitioned so it contains four complete VPDUs, and both CTUs 42 and 44 are partitioned by binary-tree splitting into two CUs, so each CU in CTUs 42 and 44 contains two complete VPDUs. Block partitioning structures of these three CTUs 40, 42, and 44 satisfy the partition constraint as each resulting CU contains one or more complete VPDUs according to the second constraint. Four VPDUs are completely contained in the resulting CU of CTU 40 and two VPDUs are completely contained in the resulting CUs of CTUs 42 and 44. CTUs 46 and 48 are first partitioned by quadtree splitting, the upper-left partition of CTU 46 is further partitioned by vertical ternary-tree splitting, and the upper-left partition of CTU 48 is further partitioned by horizontal ternary-tree splitting. Block partitioning structures of these two CTUs 46 and 48 also satisfy the partition constraint as each VPDU contains one or more complete CUs according to the first constraint.

Figure 5:
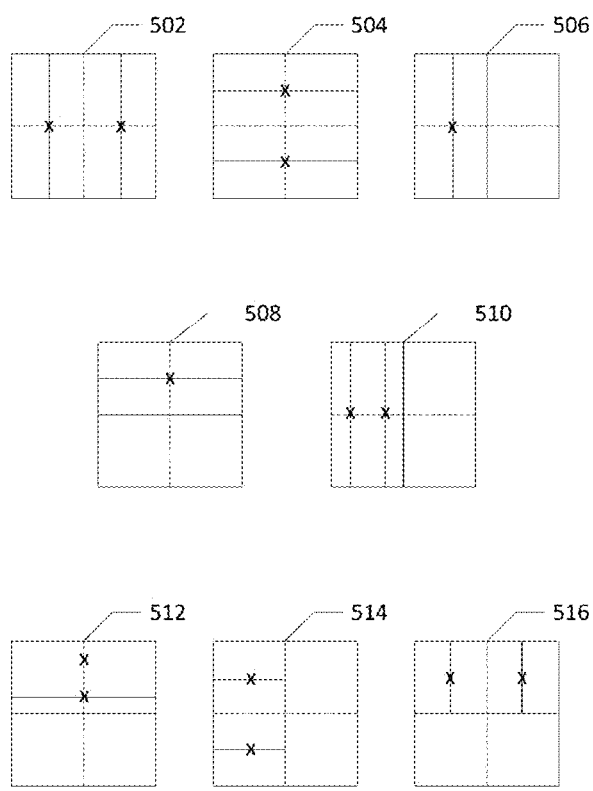
FIG. 5 illustrates some exemplary block partitioning structures of a CTU violating the partition constraint when square VPDUs are used to process CUs in each CTU according to embodiments of the present invention.

FIG. 5 illustrates some examples of invalid binary-tree splitting or ternary-tree splitting under the restriction of the partition constraint. Same square VPDUs indicated by dashed lines, each with a size of 64×64 are used to process the CTUs with a size of 128×128 as shown in FIG. 5. CTUs 502 and 504 are partitioned by vertical ternary-tree splitting and horizontal ternary-tree splitting respectively and the resulting CUs violate the proposed constraint as each CU does not contain one or more complete VPDUs and each VPDU does not contain one or more complete CUs. CTUs 506 and 508 are first partitioned by binary-tree splitting followed by another binary-tree splitting in the same direction. The second binary-tree splitting is invalid as the resulting CUs violate the partition constraint. Each CU in the left half of CTU 506 or each CU in the upper half of CTU 508 does not contain one or more complete square VPDUs, and each VPDU in the left half of CTU 506 or each VPDU in the upper half of CTU 508 does not contain one or more complete CUs. One or more CUs partitioned from CTU 506 or 508 violate both the first and second constraints. In the example as shown in CTUs 510 and 512, these two CTUs are partitioned by binary-tree splitting followed by ternary-tree splitting in the same direction. Ternary-tree splitting applied after binary-tree splitting is prohibited because the resulting CUs violate the partition constraint, each of the three CUs in the left half of CTU 510 or each of the three CUs in the upper half of CTU 512 is not completely contained in a pipeline unit; and each of these CUs does not contain one or more complete pipeline units. CTUs 514 and 516 are partitioned by binary-tree splitting followed by ternary-tree splitting in a different direction. This ternary-tree splitting is also invalid as each of the resulting CUs does not contain one or more complete VPDU and each VPDU does not contain one or more complete CUs.

Figure 6A:
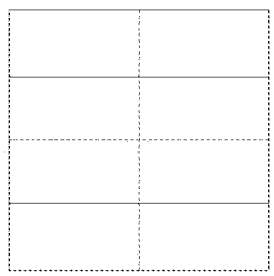
FIG. 6A illustrates an exemplary block partitioning structure of a CTU satisfying the re-visit constraint according to embodiments of the present invention.
Figure 6B:
FIG. 6B illustrates an exemplary block partitioning structure of a CTU violating the re-visit constraint according to embodiments of the present invention.

Partition Constraint Employs Re-visit Constraint Some embodiments of the partition constraint evaluate the validity of a predefined splitting type according to a re-visit constraint, in which a processing order of the sub-blocks partitioned from a current block by a predefined splitting type shall not allow leaving a pipeline unit and then re-visiting the pipeline unit again. The predefined splitting type is not allowed to partition the current block if the re-visit constraint is violated. The re-visit constraint is violated when processing of the sub-blocks requires re-visiting a pipeline unit after leaving the pipeline unit. FIG. 6A and FIG. 6B illustrate two exemplary block partitioning structures of a CTU, where one satisfies the re-visit constraint while another violates the re-visit constraint. In FIG. 6A and FIG. 6B, each 128×128 block is partitioned into four square TUs, and each TU size is 64×64. The dash lines in FIG. 6A and FIG. 6B are TU boundaries inside the corresponding CTU, and the solid lines inside the corresponding CTU are CU boundaries. The pipeline units are set to 64×64 and are aligned with the TUs. The CTU in FIG. 6A is partitioned by horizontal ternary-tree splitting into three CUs, and the processing order of the three CUs does not require re-visiting any pipeline unit. For example, when processing CUs in an upper-left pipeline unit or an upper-right pipeline unit, reconstructed data of above and left CUs are available, and re-visiting the upper-left or upper-right pipeline unit is not needed after leaving the upper-left or upper-right pipeline unit. The block partitioning structure shown in FIG. 6A thus satisfied the re-visit constraint. The CTU in FIG. 6B is partitioned by vertical ternary-tree splitting into three CUs; however, the processing order of the three CUs requires re-visiting the pipeline units. The block partitioning structure shown in FIG. 6B thus violates the re-visit constraint.

Constrain by Two Thresholds W and H By analyzing the first, second, and the re-visit constraints as well as the above examples of valid and invalid block partitioning structures, applying a particular splitting to partition a block is allowed or prohibited may depend on a block width, a block height, or both the block width and block height. For example, in a case of selecting a pipeline unit size to be N×N, an example of N is 64, horizontal ternary-tree splitting is prohibited when the block width is larger than N, vertical ternary-tree splitting is prohibited when the block height is larger than N, horizontal binary-tree splitting is prohibited when the block width is larger than N and the block height is smaller than or equal to N, and vertical binary-tree splitting is prohibited when the block width is smaller than or equal to N and the block height is larger than N. To generalize the concept of VPDU as previously described, two thresholds W and H may be used to represent a width and a height of the VPDU, and one or more predefined splitting types are determined as valid or invalid by comparing one or both of the width and height of the current block with one of both of these two thresholds.

The following embodiments determine whether a predefined splitting type is valid or invalid for partitioning a current block according to one or both of the thresholds W and H. The two thresholds W and H are positive integers, which may be predefined values, signaled values transmitted in sequence, picture, slice, or tile level, derived values, or equal to a maximum transform block width and a maximum transform block height respectively. For example, W is predefined as 32 or 64, and H is predefined as 32 or 64. An example of the thresholds W and H is implicitly derived by one or a combination of the CTU size and slice type. The maximum transform block width and height may be a maximum luma transform width and height or a maximum chroma transform width and height. Before partitioning a current block, one or both of a block width and block height are compared to the corresponding thresholds W or/and H. In a first embodiment of constraining Ternary-Tree (TT) splitting, if a block width of a current block is larger than W and a block height is larger than H, TT splitting is not allowed to partition the current block. In an embodiment of constraining Binary-Tree (BT) splitting, if a block width of a current block is larger than W and a block height is less than or equal to H, horizontal BT splitting is not allowed to partition the current block. If a block height of a current block is larger than H and a block width is less than or equal to W, vertical BT splitting is not allowed to partition the current block.

In a second embodiment of constraining TT splitting, horizontal TT splitting is not allowed to partition a current block if a block width of the current block is larger than or equal to W and a block height divide by 4 is smaller than H. Similarly, vertical TT splitting is not allowed to partition a current block if a block width divide by 4 is smaller than W and a block height is larger than or equal to H. In a third embodiment of constraining TT splitting, horizontal TT splitting is not allowed to partition a current block if a block width is larger than W, and a block height is larger than H and the block height divide by 4 is smaller than H. Similarly, vertical TT splitting is not allowed to partition a current block if a block width is larger than W and the block width divide by 4 is smaller than W, and the block height is larger than H. In a fourth embodiment of constraining TT splitting, if a block width of a current block is larger than or equal to W, and a block height is larger than H and the block height divide by 4 is smaller than H, horizontal TT splitting is not allowed to partition the current block. If a block width is larger than W and the block width divide by 4 is smaller than W, and a block height is larger than or equal to H, vertical TT splitting is not allowed to partition the current block. In a fifth embodiment of constraining TT splitting, horizontal TT splitting is not allowed if a block width of a current block is larger than W, and a block height is larger than H and the block height divide by 4 is not a multiple of H. Vertical TT splitting is not allowed if a block width of a current block is larger than W and the block width divide by 4 is not a multiple of W, and a block height is larger than H.

The above embodiments may be applied as a normative constraint, where at least a partition syntax is inferred according to a comparing result of width and/or height and W and/or H, and the partition syntax is not signaled in the video bitstream. For example, according to the first embodiment of constraining TT splitting, a TT split syntax for a current block is not signaled or parsed if a block width of the current block is larger than W and a block height is larger than H, as the TT split syntax is inferred as not split. According to the embodiment of constraining BT splitting, a horizontal BT split or BT split direction for a current block is not signaled or parsed if a block width of the current block is larger than W and a block height is equal to or smaller than H. The horizontal BT split is inferred as not split or the BT split direction is inferred as vertical split. A vertical BT split or BT split direction for a current block is not signaled or parsed if a block height of the current block is larger than H and a block width is equal to or smaller than W. The vertical BT split is inferred as not split or the BT split direction is inferred as horizontal split. In an example of implementing the second embodiment of constraining TT splitting, a horizontal TT split syntax for a current block is not signaled or parsed if a block width of the current block is larger than or equal to W and a block height divide by 4 is smaller than H. The horizontal TT split for the current block is inferred as not split. A vertical TT split syntax for a current block is not signaled or parsed if a block width divide by 4 is smaller than W and a block height is larger than or equal to H. The vertical TT split for the current block is inferred as not split. In an example of implementing the third embodiment of constraining TT splitting, a horizontal TT split syntax for a current block is not signaled or parsed if a block width of the current block is larger than W, and a block height is larger than H and the block height divide by 4 is smaller than H. The horizontal TT split syntax is inferred as not split. A vertical TT split syntax for a current block is not signaled or parsed if a block width of the current block is larger than W and the block width divide by 4 is smaller than W, and a block height is larger than H. The vertical TT split syntax is inferred as not split. For the fourth embodiment of constraining TT splitting, if a block width of a current block is larger than or equal to W, and a block height is larger than H and the block height divide by 4 is smaller than H, a horizontal TT split syntax is not signaled nor parsed as it is inferred as not split. If a block width of a current block is larger than W and the block width divide by 4 is smaller than W, and a block height is larger than or equal to H, a vertical TT split syntax is not signaled nor parsed as it is inferred as not split. For the fifth embodiment of constraining TT splitting implemented by normative constraint, if a block width of a current block is larger than W, and a block height is larger than H and the block height divide by 4 is not a multiple of H, a horizontal TT split syntax is not signaled nor parsed as it is inferred as not split. Similarly, if a block width of a current block is larger than W and a block width divide by 4 is not a multiple of W, and a block height is larger than H, a vertical TT split syntax is not signaled nor parsed as it is inferred as not split.

Examples of Valid or Invalid Splitting Type Some embodiments of splitting a current block follow a list of partition constraints selected from the following constraints, in which a splitting type is allowed or not allowed to partition the current block depending on a size, width, or height of the current block, a size of resulting sub-blocks, or the processing order of resulting sub-blocks. A pipeline unit is defined as 64×64 for a luma component or 32×32 for chroma components for a 4:2:0 color format in the following constraints.

1. TT splitting cannot be applied to partition a 128×128 CTU.

2. TT splitting cannot be applied to partition a 128×N block or N×128 block, where N is a positive integer less than or equal to 64.

3. Horizontal BT splitting cannot be applied to partition a 128×N block. The block width of the 128×N block is 128 and the block height is N, where N is a positive integer less than or equal to 64.

4. Vertical BT splitting cannot be applied to partition an N×128 block. The block width of the N×128 block is N and the block height is 128, where N is a positive integer less than or equal to 64.

5. In separate coding tree, splitting of a chroma block is not allowed if any of the resulting chroma CU is smaller than P×Q. An example of P×Q is 4×4, which means 4×2, 2×4, and 2×2 chroma CUs are not allowed.

6. A resulting sub-block after partitioning with a block size equal to 128×128, 128×64, or 64×128 is allowed.

7. BT splitting and TT splitting cannot be applied to a current block if the resulting partitioned CU processing order cannot meet a z-scan constraint in a CTU. For example, vertical BT splitting is not allowed to partition a 128×128 CTU because the coding order of the M×N blocks of the 128×128 CTU is not in a z-scan order.

Non-square Pipeline Unit A pipeline unit is a basic unit for pipeline processing, and in order to support flexible computation, each pipeline unit may be square or non-square according to some embodiments. All CUs inside a pipeline unit are processed together without being inserted by any CU inside another pipeline unit in the processing order. A size or area of a pipeline unit is predefined, signaled in a sequence, picture, slice, tile, CTU, CTU row level, or derived. For example, an area of a VPDU is predefined to equal to 16384, 4096, or 1024 pixels. An example of a predefined VPDU size is set to equal to a maximum transform unit size, such as 32×32 in the HEVC standard or 64×64 in the VVC standard. An example of implicitly defined VPDU size or area is derived based on a profile or level of a corresponding video compression standard.

Similar to the square pipeline units, the first and second constraints may be used to restrict certain partitioning behaviors, and one of the first and second constraints must be satisfied during block partitioning at each sub-tree partitioning depth. In other words, violation of both first and second constraints at any sub-tree partitioning depth is not allowed. In the first constraint, quadtree, binary-tree, or ternary-tree splitting is allowed for partitioning a current block when the size of the current block is equal to or smaller than a VPDU size or area. In the second constraint, quadtree, binary-tree, or ternary-tree splitting is allowed only when all sizes or areas of sub-blocks are equal to a VPDU size or VPDU area multiplied by a positive integer after sub-tree partition. Another embodiment of the second constraint only allow quadtree, binary-tree, or ternary-tree splitting when a size or area of a group of sub-blocks partitioned from the current block are equal to the VPDU size or VPDU area multiplied by a positive integer after sub-tree partition. The group of sub-blocks includes all the children blocks that are processed in a sequential order and are processed together, and the size or area of the group of sub-blocks is smaller than a current block. In one embodiment, if a size or area of a current block is twice as large as the VPDU size or VPDU area, this current block can be partitioned by quadtree splitting or binary-tree splitting, but cannot be partitioned by ternary-tree splitting. For example, a CTU size is 128×128 and a VPDU area is defined as 4096, so the allowed VPDU sizes are 64×64, 128×32, and 32×128, then a current block with a size 128×64 or 64×128 cannot be partitioned using ternary-tree splitting. If the size or area of the current block is four times as large as the VPDU size or VPDU area, any of quadtree, binary-tree, and ternary-tree splitting can be used to partition the current block.

In another embodiment of the second constraint, if a current block size or area is twice of a VPDU size or VPDU area, the current block can only be partitioned by quadtree splitting or binary-tree splitting, but not ternary-tree splitting, and if the current block size or area is larger than two times of the VPDU size or VPDU area, all quadtree splitting, binary-tree splitting, and ternary-tree splitting can be used to partition the current block. According to the first constraint, any of quadtree splitting, binary-tree splitting, and ternary-tree splitting can be used to partition a current block if a current block size is smaller than the VPDU size or VPDU area.

Another embodiment of the second constraint checks if a current block size or area is twice as large as a VPDU size or VPDU area, and if the current block size or area is two times the VPDU size or area, ternary-tree splitting is not allowed for partitioning the current block. Ternary-tree splitting is allowed to partition a current block if the size or area of the current block is larger than two times of the VPDU size or VPDU area. In this embodiment, ternary-tree splitting is not allowed to partition a current block if a size or area of the current block is smaller than the VPDU size or VPDU area.

Figure 7:
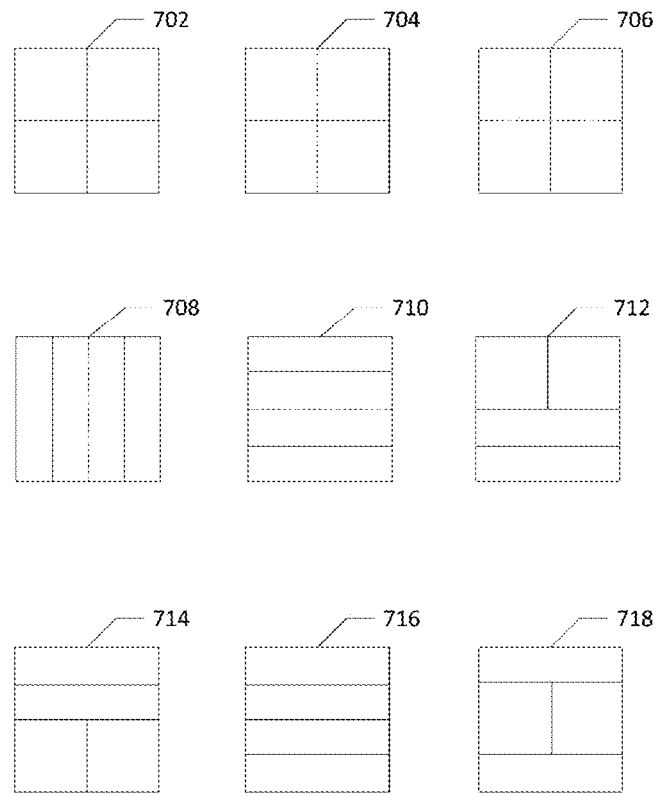
FIG. 7 illustrates some exemplary block partitioning structures of a CTU satisfying the partition constraint when both square and non-square VPDUs are used to process CUs in each CTU according to embodiments of the present invention.

FIG. 7 illustrates some examples of valid block partitioning structures when non-square VPDUs may be used to process CUs in each CTU. The VPDU area is set to be 4096, so the allowable VPDU sizes are 64×64, 128×32, and 32×128, and the CTU size is 128×128. CTU 702 is partitioned by quadtree splitting, CTUs 704 and 706 are partitioned by binary-tree splitting, and CTUs 708 and 710 are partitioned by ternary-tree splitting. Each CU in these five CTUs 702, 704, 706, 708, and 710 is larger than or equal to the VPDU area of 4096, and each CU contains one or more complete VPDUs. Square VPDUs are used to process CUs in CTU 702 while non-square VPDUs are used to process CUs in CTUs 708 and 710. CTUs 704 and 706 may be processed by square or non-square VPDUs. The center partition in CTU 708 and the center partition in CTU 710 partitioned by ternary-tree splitting may be processed by either square or non-square VPDUs. CTUs 712 and 714 are first partitioned by horizontal binary-tree splitting, and then one of the partitions is further split by vertical binary-tree splitting while another partition is further split by horizontal binary-tree splitting. The block partitioning structures of these two CTUs are valid because the resulting CUs of CTUs 712 and 714 equal to the size of one allowable VPDU size, and each CU contains one complete VPDU. CTU 716 is partitioned by horizontal binary-tree splitting, and then each of the partition is further split by another horizontal binary-tree splitting. This block partitioning structure is valid because the resulting CUs contain exactly one complete VPDU with a size equal to 128×32. CTU 718 is first partitioned by horizontal ternary-tree splitting, and the center partition is further split by vertical binary-tree splitting. The resulting CUs contain either one complete 128×32 VPDU or one complete 64×64 VPDU.

The block partitioning structures of CTUs 502, 504, 506, and 508 as shown in FIG. 5 are prohibited when the CTUs are processed by square VPDUs, however these block partitioning structures are allowed if non-square VPDUs are used. The block partitioning structures of CTUs 510, 512, 514, and 516 are prohibited no matter the CTUs are processed by square or non-square VPDUs.

Figure 8:
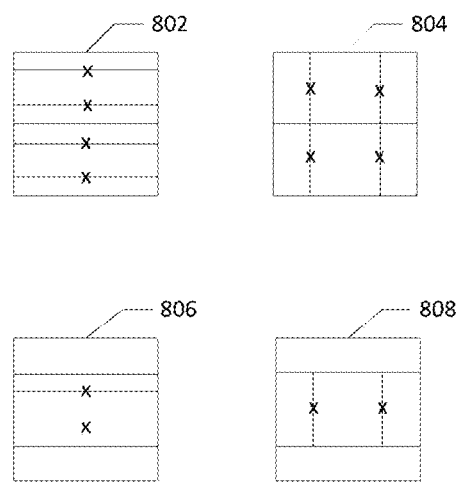
FIG. 8 illustrates some exemplary block partitioning structures of a CTU violating the partition constraint when both square and non-square VPDUs are used to process CUs in each CTU according to embodiments of the present invention.

FIG. 8 illustrates some other examples of invalid block partitioning structures when non-square VPDUs may be used to process CUs in each CTU. The allowable VPDU sizes are same as the examples in FIG. 7, including 64×64, 128×32, and 32×128, and the CTU sizes of CTUs 802, 804, 806, and 808 are 128×128. CTU 802 is partitioned by horizontal binary-tree splitting and then each partition is further partitioned by horizontal ternary-tree splitting. Horizontal ternary-tree splitting after horizontal binary-tree splitting is not allowed because there is no allowable VPDU size can contain one or more complete CUs partitioned from horizontal ternary-tree splitting. CTU 804 is first split by horizontal binary-tree splitting then each partition is split by vertical ternary-tree splitting. The vertical ternary-tree splitting after horizontal binary-tree splitting is not allowed because the processing order of the resulting CUs violates the "re-visit pipeline unit" constraint. The processing order of CUs partitioned from one CTU must ensure re-visit a VPDU is not permitted after leaving the VPDU no matter square or non-square VPDUs are used. In this case, even if a 32×128 VPDU contains two complete CUs including an upper-left CU and a lower-left CU in CTU 804, the decoding process of the lower-left CU may need to wait for the decoding process of the upper-left CU. For example, if the lower-left CU in CTU 804 is coded in intra prediction mode, it requires neighboring reconstructed samples of the upper-left CU, which introduces additional latency since these two CUs are in the same VPDU. In another example, CTU 806 is first partitioned by horizontal ternary-tree splitting, and the center partition is further split by another horizontal ternary-tree splitting. The resulting CUs violate the first constraint as not all VPDUs contain one or more complete CUs, and the resulting CUs also violate the second constraint as not all CUs contain one or more complete VPDUs. CTU 808 is partitioned by horizontal ternary-tree splitting followed by splitting the center partition using vertical ternary-tree splitting. Vertical ternary-tree splitting is prohibited because the resulting CUs of vertical ternary-tree splitting are not completely contained in VPDUs with any allowable size.

Figure 9A:
FIG. 9A illustrates an example of allowing vertical ternary-tree splitting when a current block size is twice of a VPDU size according to an embodiment of the present invention.
Figure 9B:
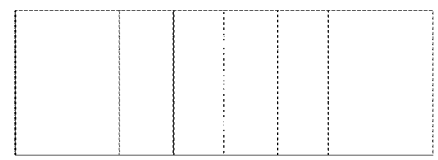
FIG. 9B illustrates another example of allowing vertical ternary-tree splitting when a current block size is twice of a VPDU size according to an embodiment of the present invention.

In one embodiment of determining whether ternary-tree splitting is allowed according to the second constraint, if a current block size or area is twice of a VPDU size or VPDU area, ternary-tree splitting is allowed unless all the further binary-tree or ternary-tree splitting directions are the same and the center sub-block of the current block is partitioned by binary-tree splitting. Two examples of this embodiment are illustrated in FIG. 9A and FIG. 9B. In FIG. 9A, a current block is first partitioned by vertical ternary-tree splitting, and then a center sub-block of the current block is partitioned by vertical binary-tree splitting. Ternary-tree splitting is illustrated by solid lines and binary-tree splitting is illustrated by a dashed line in FIG. 9A and FIG. 9B. In FIG. 9B, a current block is partitioned by vertical ternary-tree splitting into three first-layer sub-blocks, a center first-layer sub-block of the current block is further partitioned by vertical ternary-tree splitting into three second-layer sub-blocks, then a center second-layer sub-block is again partitioned by vertical binary-tree splitting.

In one embodiment of the second constraint, if a size or area of a current block is twice of the VPDU size or area, the current block cannot be further split. In another embodiment, if a size or area of a current block is twice of the VPDU size or area, and a default maximum split depth for binary-tree splitting is N, the maximum split depth for binary-tree of the current block is M, where $0 \leq M < N$. For example, if N=3, then M is 0, 1 or 2. For example, a VPDU area is 4096, and for a current block with a size of 128×64 or 64×128, the maximum split depth for binary-tree splitting of the current block M is less than a default maximum split depth for binary-tree splitting N.

The usage of non-square VPDU may be predefined, derived, or signaled in a sequence, picture, slice, tile, CTU, or CTU row level, or a sub-tree partition. In one exemplary embodiment, a flag is used to decide the usage of non-square VPDU in a current block if the current block is further split. In another embodiment, the usage of non-square VPDU is derived by a current block size or area. In yet another embodiment, the usage of non-square VPDU is derived by a current block ratio, where the current block ratio is calculated by dividing a block width by a block height, or dividing a block height by a block width. In another embodiment, the usage of non-square VPDU is derived by a current sub-tree partitioning depth.

Figure 10:
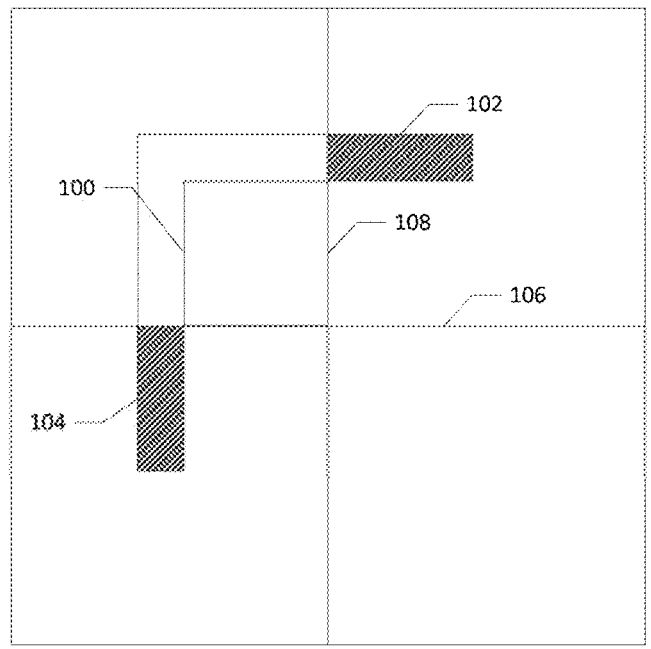
FIG. 10 illustrates prediction of a current block using padded samples to replace reconstructed neighboring samples across the pipeline unit boundary according to an embodiment.

Reference Samples Outside Pipeline Unit Some embodiments employ the partition constraint of the present invention to an intra or inter prediction tool. A padding method may be applied to generate padded samples when prediction of a current block requires reconstructed neighboring samples across a pipeline unit boundary according to one embodiment. FIG. 10 illustrates an example of generating padded samples when reconstructed neighboring samples across a VPDU boundary are required for processing a current CU. A right boundary and a bottom boundary of the current CU 100 are on the VPDU boundaries 106 and 108. Reconstructed neighboring samples 102 and 104 required for prediction of the current CU 100 are replaced by padded samples during the prediction process. The padding method may be the same as the padding method used to generate padded samples to replace reference samples across CTU or picture boundaries. The padding method is applied in either vertical or horizontal direction, or it is applied in both vertical and horizontal directions. In an alternative embodiment, when reconstructed neighboring samples across a pipeline unit boundary is required for intra or inter prediction of a current block, those reconstructed neighboring samples are treated as unavailable. The intra prediction refers to an angular intra prediction, linear model prediction, or linear model prediction method using upper-left or bottom-right neighboring samples among different color component or combined prediction using both intra and inter prediction.

Figure 11:
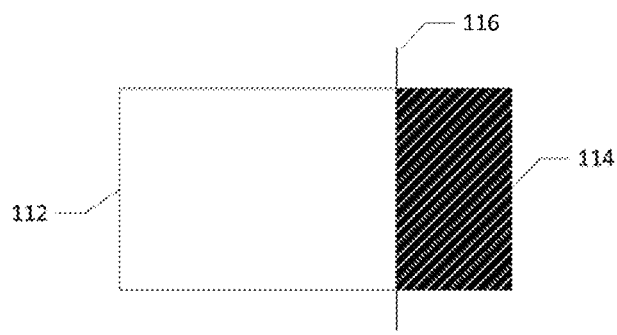
FIG. 11 illustrates an embodiment of using padded samples to replace samples inside a current VPDU but outside a picture boundary.

Samples of Pipeline Unit Outside Picture Boundary For pipeline units across a picture boundary, samples outside the picture boundary are padded as at CTU or picture boundaries. FIG. 11 illustrates an example of replacing samples outside a picture boundary with padded samples for a VPDU across the picture boundary. A current CU 112 is across a picture boundary 116, and samples 114 outside the picture boundary 116 are replaced by padded samples. The padded samples may be generated by padding in either vertical or horizontal direction or both vertical and horizontal directions.

Maximum TT Size and Maximum BT Size A maximum TT size (max_TT_size) may be defined to restrict applying ternary-tree splitting to any CU with a size larger than this maximum TT size. The maximum TT size is set to M×N, and it may be a predefined value, a signaled value transmitted in sequence, picture, slice, or tile level, a derived value, or equal to a maximum transform block size. An example of the maximum TT size is implicitly derived from a CTU size or a slice type. The maximum transform block size may be a maximum luma transform size or a maximum chroma transform size for luma blocks or chroma blocks respectively. For example, the maximum TT size is set to equal to 64×64, and if a current CU is larger than 64×64, for example, the size of the current CU is 128×128, 128×64, or 64×128, the current CU cannot be further partitioned by horizontal ternary-tree splitting or vertical ternary-tree splitting.

A maximum BT size (max_BT_size) may be defined to restrict applying binary-tree splitting, including symmetrical BT splitting, asymmetrical BT splitting, horizontal BT splitting and vertical BT splitting, to any CU larger than this maximum BT size. The maximum BT size is an M×N block, where M×N is a predefined value such as 64×64, a signaled value transmitted in sequence, picture, slice, or tile level, a derived value, or a maximum transform block size. The maximum BT size may be derived depending on one or a combination of the CTU size and slice type. The maximum transform block size is either a maximum luma transform size for luma blocks or a maximum chroma transform size for chroma blocks. An example of the maximum BT size is equal to 64×64, if a current CU is larger than 64×64, for example, if the current CU is 128×128, 128×64, or 64×128, the current CU cannot be partitioned by any BT splitting.

Alternatively, a maximum BTT size (max_BTT_size) is defined to restrict applying both BT splitting and TT splitting to partition any block larger than max_BTT_size. BT splitting including symmetrical BT and asymmetrical BT splitting and TT splitting cannot be applied for CUs larger than the maximum BTT size. The max_BTT_size is M×N, where M×N is a predefined value, a signaled value transmitted in sequence, picture, slice, or tile level, a derived value, or equal to the maximum transform block size. The maximum transform block size may be a maximum luma transform size for luma blocks or a maximum chroma transform size for chroma blocks. An example of the maximum BTT size is derived according to one or a combination of the CTU size and slice type. A current CU with a size larger than the maximum BTT size cannot be split by horizontal BT splitting, vertical BT splitting, horizontal TT splitting, or vertical TT splitting.

Maximum Allowed Sub-tree Partitioning Depth In some embodiments of sub-tree partitioning, ternary-tree splitting is allowed for splitting a current block when a current sub-tree depth is equal to or smaller than a maximum allowed sub-tree partitioning depth minus a threshold N. The threshold N is implicitly indicated and inferred at the decoder side, and an indicator for selecting the TT splitting type is absent when the current sub-tree depth is larger than the maximum allowed sub-tree partitioning depth minus N. For example, a current sub-tree partition depth is S, and the maximum allowed sub-tree partitioning depth is denoted as M, TT splitting is allowed for partitioning a current block when $S \leq (M-N)$, where $M > N \geq 0$. Besides, if the current sub-tree partition depth is larger than (M−N), then the indicator for selecting ternary-tree splitting is absent. The threshold N for blocks in a current slice in another embodiment is adaptively determined according to the slice type or color component of the current slice, or temporal layer ID of the current slice. The threshold N is implicitly determined and inferred at the encoder and decoder sides, and an indicator for selecting the ternary-tree splitting type is absent when a current sub-tree partition depth is larger than the maximum allowed sub-tree partitioning depth minus N. For example, the threshold is $N_1$ for blocks in an Intra slice and $N_2$ for blocks in an Inter slice. Suppose a current sub-tree partition depth is denoted as S and a maximum allowed sub-tree partition depth is denoted as M If a current slice is an Intra slice, ternary-tree splitting is allowed for partitioning a current block in the current slice when $S \leq (M-N_1)$, and an indicator for selecting the ternary-tree splitting type is absent once $S > (M-N_1)$. Similarly, if a current slice is an Inter slice, ternary-tree splitting is allowed for partitioning a current block in the current slice when $S \leq (M-N_2)$, and an indicator for selecting the ternary-tree splitting type is absent once $S > (M-N_2)$.

Multiple-Tree Depth Some embodiments define a Multiple-Tree Depth (MTDepth) to count the partition depth of binary-tree splitting and ternary-tree splitting. In an embodiment of defining a MTDepth of two sub-blocks partitioned by binary-tree splitting, the MTDepth of the sub-blocks is the MTDepth of its parent block plus 1; however, the MTDepth of a first and third sub-blocks partitioned by ternary-tree splitting is the MTDepth of its parent block plus 2 while the MTDepth of a second sub-block partitioned by ternary-tree splitting is the MTDepth of its parent block plus 1. The second sub-block partitioned by ternary-tree splitting is the center partition having a size larger than the size of each side partition. In another embodiment, the MTDepth is counted in the same way for binary-tree splitting as the previous embodiment, but when counting the MTDepth by ternary-tree splitting, the MTDepth of all the three sub-blocks split from a parent block by ternary-tree splitting is the MTDepth of the parent block plus 1. In yet another embodiment, the MTDepth is incremented by 1 after each binary-tree splitting while the MTDepth is incremented by 2 after each ternary-tree splitting. The MTDepth of the first, second, and third sub-blocks partitioned by ternary-tree splitting is the MTDepth of its parent block plus 2.

The MTDepth can be used as a criterion for selecting the context model in coding the CU partition type or partitioning direction. In one embodiment, the depth of a current CU is defined by a sum of a weighted quadtree depth (QTDepth×m) and a weighted multiple-tree depth (MTDepth×n). The context model selection is based on the relations between the depth of the current, left, and above CUs. For example, the context model index for a current CU is 2 if depths of the left and above CUs are both larger than the depth of the current CU; and the context model index is 1 if only the depth of the left or above CUs is larger than the depth of the current CU; otherwise, the context model index of the current CU is 0. An example of the weighting factor m is 1 and the weighting factor n is also 1, and another example of the weighting factor m is 2 and the weighting factor n is 1. In another embodiment, the selected context model index of a current CU is (QTDepth×m+MTDepth×n).

The MTDepth can be used to indicate whether a current CU is further split or not. In one embodiment, if a maximum allowed CU split depth by BT and TT splitting is set to k, a current block is not further split if the MTDepth of the current block is larger than the maximum allowed CU split depth k. In another embodiment, the current block is not further split if the MTDepth of the current block is larger than or equal to the maximum allowed CU split depth k.

An embodiment of the Multiple-Tree Depth (MTDepth) is employed to determine whether a delta Quantization Parameter (QP) is signaled for a split node. For example, a delta QP for a split node is conditionally signaled in a video bitstream depending on a quadtree depth (quadTreeDepth) and the Multiple-Tree Depth (MTDepth) of the split node. A maximum delta QP signaling depth (diff_cu_qp_delta_depth) is predefined, derived, or signaled in a slice level, picture level, tile level, and or sequence level to restrict the maximum depth for signaling a delta QP. In a case when the delta QP is enabled, for a leaf CU with a depth smaller than or equal to the maximum depth QP signaling depth, and the leaf CU has at least one non-zero coefficient or at least one escape palette, a delta QP is signaled. For a split node (e.g. not leaf CU) with a depth equal to the maximum delta QP signaling depth, at most one delta QP is signaled in this split node. If one of the leaf CU has at least one non-zero coefficient or at least one escape palette, a delta QP is signaled. The signaled delta QP is shared by all the leaf CUs within the split node. The delta QP may be signaled after a first coded block flag (cbf) when the first cbf is equal to a first value or after a first escape palette flag when the first escape palette flag is equal to a second value, where the first value indicates the CU has at least one non-zero coefficient, and the second value indicates the CU has at least one escape palette. For example, IsCuQpDeltaCoded is set (i.e. IsCuQpDeltaCoded=0) when encoding or decoding a CU with a QP value newly signaled for the CU. The following pseudo codes demonstrate various embodiments of conditionally signaling a delta QP depending on both the quadTreeDepth and MTDepth.

```
if ( cu_qp_delta_enabled_flag
&& quadTreeDepth + (MTDepth>>1) <= diff_cu_qp_delta_depth) {
    IsCuQpDeltaCoded = 0
    CuQpDeltaVal = 0
}
if ( cu_qp_delta_enabled_flag &&
    quadTreeDepth + ((MTDepth+1)>>1) <= diff_cu_qp_delta_depth) {
    IsCuQpDeltaCoded = 0
    CuQpDeltaVal = 0
}
if ( cu_qp_delta_enabled_flag &&
    quadTreeDepth + ((MTDepth+K)>>N) <= diff_cu_qp_delta_depth) {
    IsCuQpDeltaCoded = 0
    CuQpDeltaVal = 0
}
``` where K and N are predefined integers, some examples are K=2 and N=1, K=0 and N=0, and K=1 and N=1.

```
if ( cu_qp_delta_enabled_flag &&
    ( (L*quadTreeDepth + MTDepth) <= diff_cu_qp_delta_depth) {
    IsCuQpDeltaCoded = 0
    CuQpDeltaVal = 0
}
``` where L is a predefined integer, for example, L=2 or L=1.

The syntax of signaling a delta QP (CuQpDeltaVal) at a Transform Unit (TU) level may be similar to the syntax used in the HEVC standard and shown in the following.

```
if ( cu_qp_delta_enabled_flag && !IsCuQpDeltaCoded ) {
    cu_qp_delta_abs
    if( cu_qp_delta_abs )
        cu_qp_delta_sign_flag
}
``` where a delta QP (CuQpDeltaVal) is derived based on an absolute value (cu_qp_delta_abs) and a sign flag (cu_qp_delta_sign_flag), and the final QP value is reconstructed according to a reference QP and the delta QP (CuQpDeltaVal). When the sign flag is not present, it is inferred to be equal to 0, and when the absolute value is present, variables IsCuQpDeltaCoded and CuQpDeltaVal are derived as follows:

IsCuQpDeltaCoded=1

CuQpDeltaVal=cu_qp_delta_abs*(1−2*cu_qp_delta_sign_flag)

In an embodiment, a maximum delta QP signaling depth (diff_cu_qp_delta_depth) is signaled separately for luma and chroma components when the CU splitting structure is separately determined for the luma and chroma components. In another embodiment, even when the CU splitting structure is separately determined for luma and chroma components, a maximum delta QP signaling depth is shared by the luma and chroma components. In yet another embodiment, when the CU splitting structure is separately determined for luma and chroma components, a maximum delta QP signaling depth for the chroma components is set as a value depending on that of the luma component. For example, the maximum delta QP signaling depth for the chroma components is the maximum delta QP signaling depth for the luma component minus an integer value, such as 1 or 2. An embodiment of the MTDepth may be used to derive an area of a split node. For example, the area of a split node (cbArea) is calculated as:

cbArea=(Max CU area)>>(QT Depth×$m$+MTDepth×$n$).

where m and n are weighted factors for the quadtree depth and multiple-tree depth, for example, m is 1 and n is 1, or m is 2 and n is 1.

Some of the following exemplary embodiments assume a delta QP is conditionally signaled according to the area of a split node (cbArea) and ternary-tree splitting is used. A delta QP is signaled for all three split nodes partitioned by ternary-tree splitting according to an embodiment. In another embodiment, only one delta QP is signaled for the second split node partitioned by ternary-tree splitting, which is the center partition, and there is no new delta QP coded for the first and third split nodes. The QP used in the first split node may be the last QP, the QP used in the second split node is derived using the signaled delta QP, and this derived QP is also used in the third split node. In yet another embodiment, three ternary-tree partitions may have their own delta QP, that is, at most three delta QPs may be signaled for the three split nodes partitioned by ternary-tree splitting.

Affine Sub-block Partition Restriction An embodiment of the present invention further restricts a sub-block size of an affine coded block. A CU is divided into several sub-blocks when it is coded in a conventional affine mode. If the sub-block size is 4×4, the corresponding chroma block size is 2×2, which is undesirable. An embodiment fixes the sub-block size of an affined coded block to be 8×8 or larger than 8×8 to ensure the chroma sub-blocks are larger or equal to 4×4.

Figure 12A:
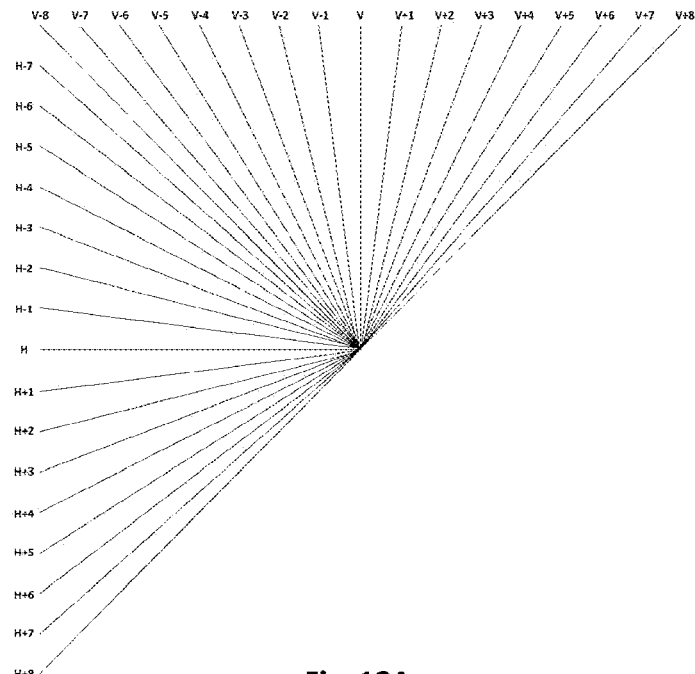
FIG. 12A illustrates 33 angular intra prediction modes supported in the HEVC standard.
Figure 12B:
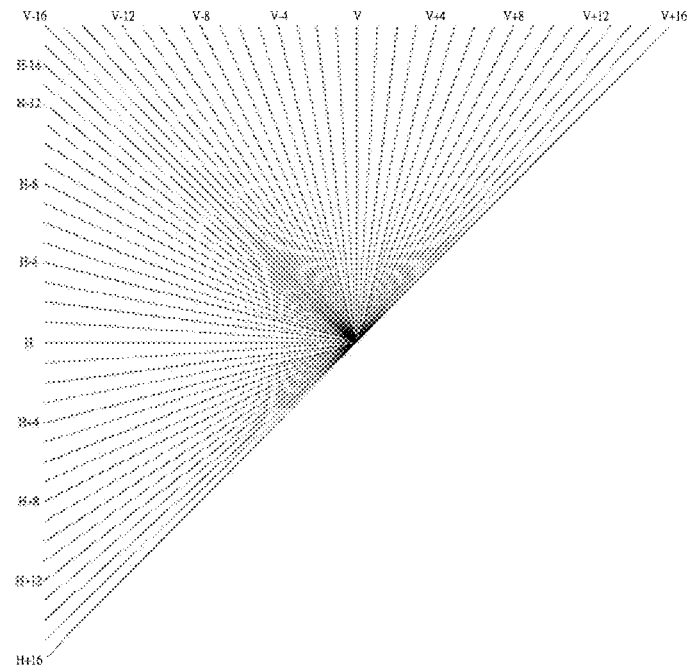
FIG. 12B illustrates an example of 65 angular intra prediction modes.

Six MPMs and Sixty-four Remaining Modes The HEVC standard supports 35 intra prediction modes including 33 angular modes, DC mode, and Planar mode. An intra predictor of a current block is derived from neighboring reference samples according to one intra prediction mode selected from the 35 modes. If an angular mode is selected, the value of each sample in a current block is predicted by extrapolating the samples from the reference samples according to the prediction direction of the selected angular mode. The value of each sample in the current block is calculated assuming an amplitude surface with a horizontal and vertical smooth gradient derived from the boundaries samples of the neighboring block if Planar mode is selected. The value of each samples of the current block is an average of the reference samples if DC mode is selected. The selected intra prediction mode is signaled explicitly or inferred from a previously decoded mode of an above or left neighboring block of the current block. The intra prediction modes of the above and left neighboring blocks are included in a set of three Most Probable Modes (MPMs). A first MPM flag is signaled to indicate whether the selected mode is identical to one of the three MPMs, if so, another flag is sent to indicate which of the three MPMs is selected; if the first MPM flag is false, the selected mode is explicitly signaled using a 5-bits fixed length codeword. The 33 angular modes used in the HEVC standard are shown in FIG. 12A, where H represents the direction of Horizontal mode and V represents the direction of Vertical mode. The number of intra prediction modes in the next-generation video coding standard is expected to expand to 67 modes including DC, Planar, and 65 angular modes as shown in FIG. 12B. Each of the angular modes can be represented by mode H+k or mode V+k, where k=0, +−1, +−2, . . . +−16. Mode H−16 and mode V−16 are the same mode as this mode refers to the prediction direction from an upper-left corner to the center of the current block. FIG. 12B illustrates the 65 angular intra prediction modes with additional 32 angular modes in between the HEVC 33 angular modes in FIG. 12A.

An embodiment selects 6 intra prediction modes as MPMs and 64 remaining modes, where the 6 MPMs include 3 modes selected from the 67 intra prediction modes of the next-generation video coding standard, and 3 additional modes. The 64 remaining modes may be coded using 6-bits fixed length coding. An example of an additional mode is an angular mode, such as a wide angular mode. The wide angular mode may be selected from modes outside the 45-degree and the 225-degree, for example, the wide angular mode is an intra mode below to mode H+16 or an intra mode right to mode V+16 in FIG. 12B. In another example, an additional mode is a mode near Vertical, Horizontal, or Diagonal mode. The additional mode may be derived by reduce the angular difference between the mode near Vertical, Horizontal, or Diagonal mode. In another example, an additional mode is a variation of Planar mode, for example, the additional mode is derived using a different bottom-right position pixel than the one used in Planar mode. Different Planar modes with different bottom-right position pixels can be added to the MPMs. Another example of an additional mode is a combined mode blending two or more original modes, for example, Vertical mode plus Planar mode, Horizontal mode plus Planar mode, Vertical mode plus DC mode, or Horizontal mode plus DC mode.

Figure 13:
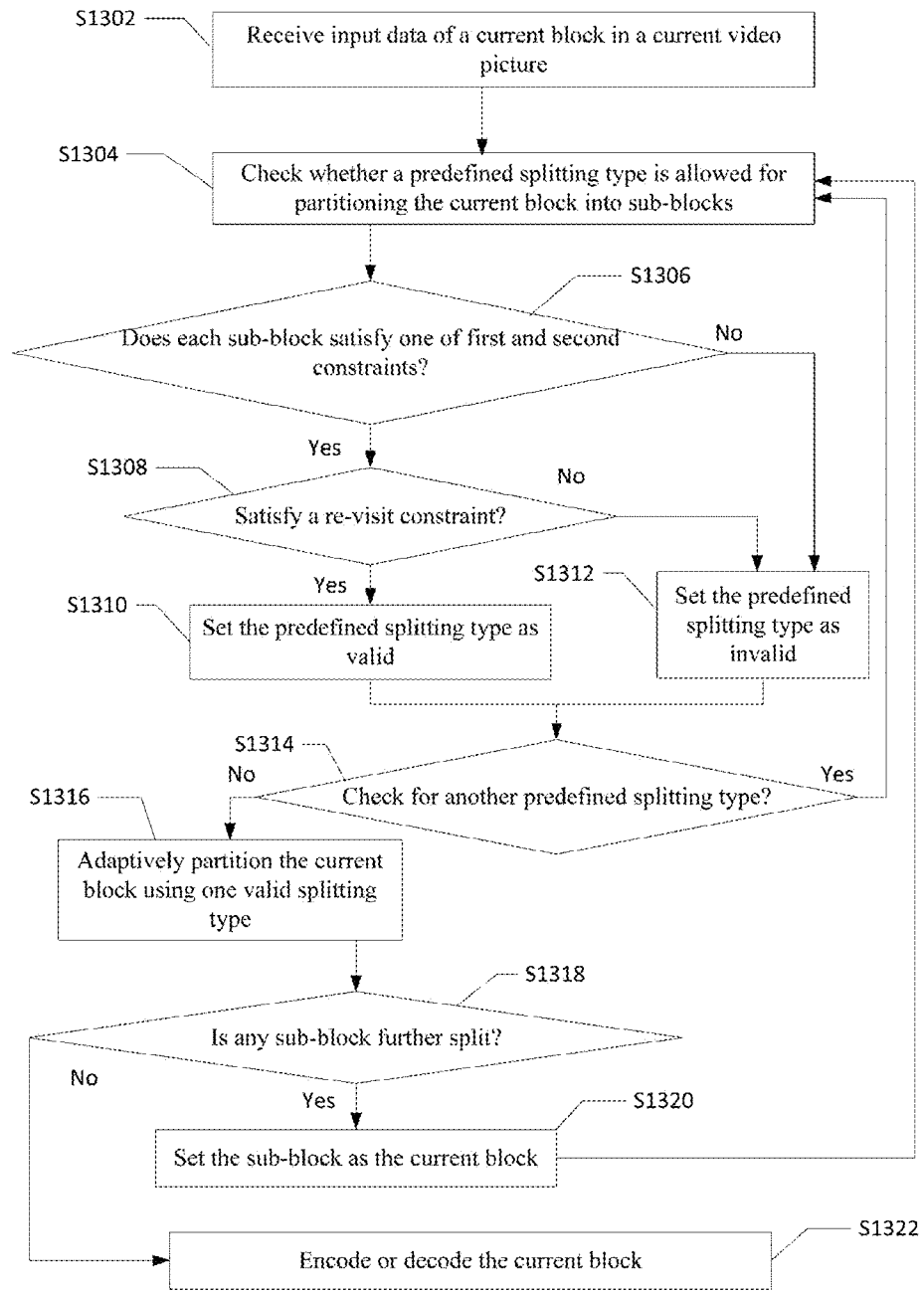
FIG. 13 is a flowchart illustrating an embodiment of the video processing method for encoding or decoding a current block in a current video picture with a partition constraint.

Exemplary Flow Charts FIG. 13 is a flowchart illustrating an exemplary embodiment of the video processing method implemented in a video encoding or decoding system. A picture is first partitioned into multiple non-overlapped blocks, such as Coding Tree Units (CTUs), and each block is further partitioned into one or more non-overlapped leaf blocks, such as leaf Coding Units (CUs), by a recursive partitioning structure. The video encoding or decoding system in this exemplary embodiment processes a current block in a current video picture by first receiving input data associated with the current block in Step S1302. A pipeline unit size of pipeline units is determined to decide the validity of one or more splitting type, where the pipeline units are defined as non-overlapping units in the current video picture designed for pipeline processing. A predefined splitting type is selected for partitioning the current block into multiple sub-blocks in Step S1304, and Step S1306 and Step 1308 checks whether this predefined splitting type is valid or invalid for partitioning the current block. Step S1306 checks if each of the sub-blocks partitioned by the predefined splitting type satisfies one of first and second constraints. The first constraint restricts each of the sub-blocks partitioned from the current block to be completely contained in one or more pipeline units, and the second constraint restricts each of the sub-blocks partitioned from the current block to contain one or more complete pipeline units. If any sub-block violates both the first and second constraints, this predefined splitting type is set as an invalid splitting type in Step S1312, if all the sub-blocks satisfy at least one of the first and second constraints, Step S1308 further checks if the sub-blocks satisfy a re-visit constraint, where the re-visit constraint prohibits re-visiting any pipeline unit in the current block after leaving the pipeline unit when processing the sub-blocks of the current block. If the sub-blocks satisfy the re-visit constraint in Step 1308, Step S1310 sets the predefined splitting type as a valid splitting type; otherwise Step S1312 sets the predefined splitting type as an invalid splitting type. In Step S1314, the video encoding or decoding system checks if the validity of another splitting type for partitioning the current block needs to be checked, for example, the video encoder or decoder first checks if horizontal binary-tree splitting is valid, and then the video encoder or decoder further checks the validity of one or more of vertical binary-tree splitting, horizontal ternary-tree splitting, and vertical ternary-tree splitting. If there is another predefined splitting type needs to be checked, the flowchart repeats the steps from S1304 to S1314. If no more splitting type needs to be checked, the current block is adaptively partitioned using one of the valid splitting type(s) into sub-blocks or the current block is not partitioned in Step S1316. The video encoding or decoding system checks if any sub-block in the current block is further split in Step S1318, sets the sub-block as a current block in Step S1320 if this sub-block is further split, and repeats the process from Step S1304 to Step S1316. If there is no more sub-block to be split, the current block is encoded or decoded according to a block partitioning structure of the current block in Step S1322.

Figure 14:
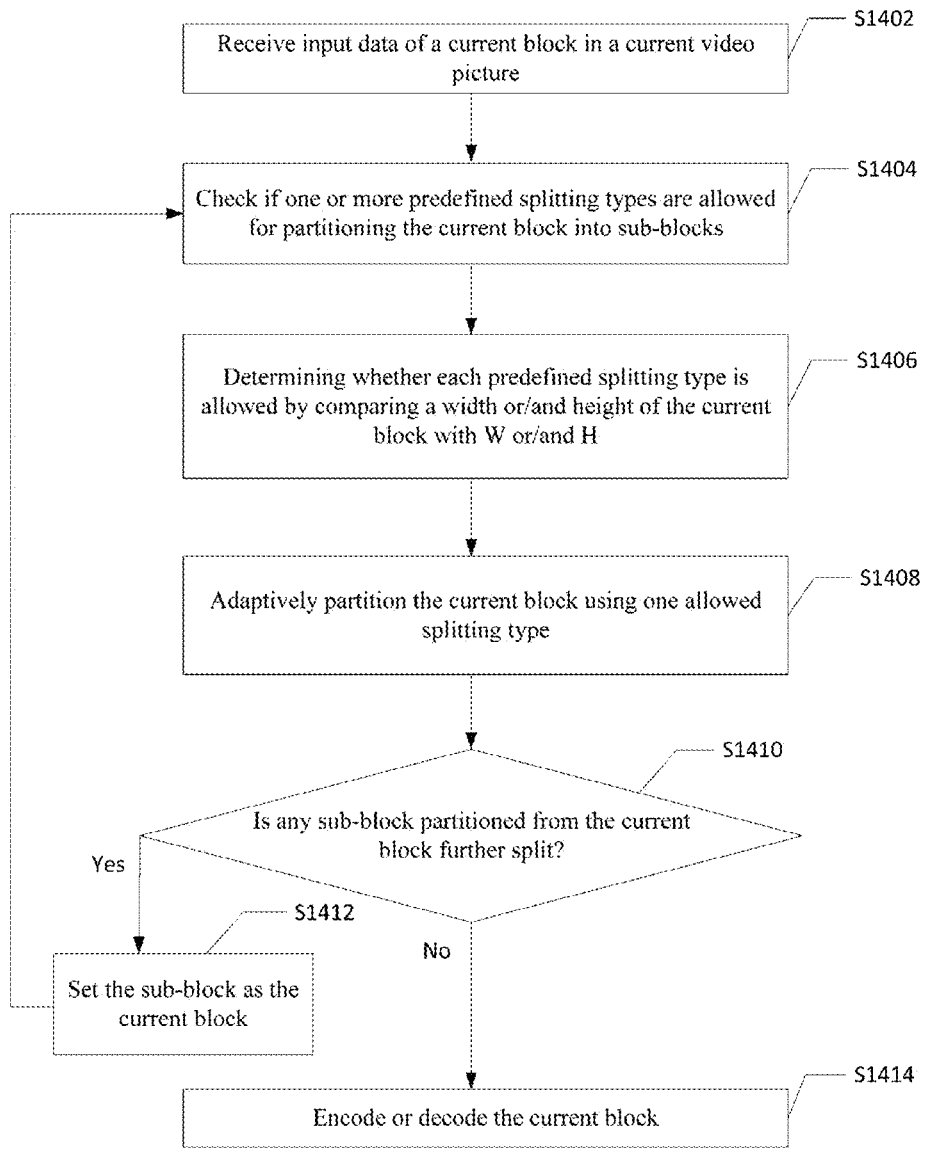
FIG. 14 is a flowchart illustrating another embodiment of the video processing method for encoding or decoding a current block in a current video picture with a partition constraint.

FIG. 14 is a flowchart illustrating another exemplary embodiment of the video processing method that can be implemented in a video encoding or decoding system. The video encoding or decoding system receives input data of a current block in a current video picture in Step S1402. Two integer thresholds W and H are determined to decide which splitting type is valid. A predefined splitting type for partitioning the current block into sub-blocks is selected in Step S1404, and the validity of this predefined splitting type for partitioning the current block is determined by comparing a width, height, or both the width and height of the current block with one or both the thresholds W and H in Step S1406. The video encoding or decoding system adaptively partitions the current block into multiple sub-blocks using an allowed splitting type in Step S1408. Step S1410 checks if there is any sub-block in the current block to be further partitioned, Step S1412 sets the sub-block as a current block if it is further partitioned, and the current block is processed by Step S1404 to Step S1410. If there is no more sub-block to be split, the current block is encoded or decoded according to a block partitioning structure of the current block in Step S1414.

Figure 15:
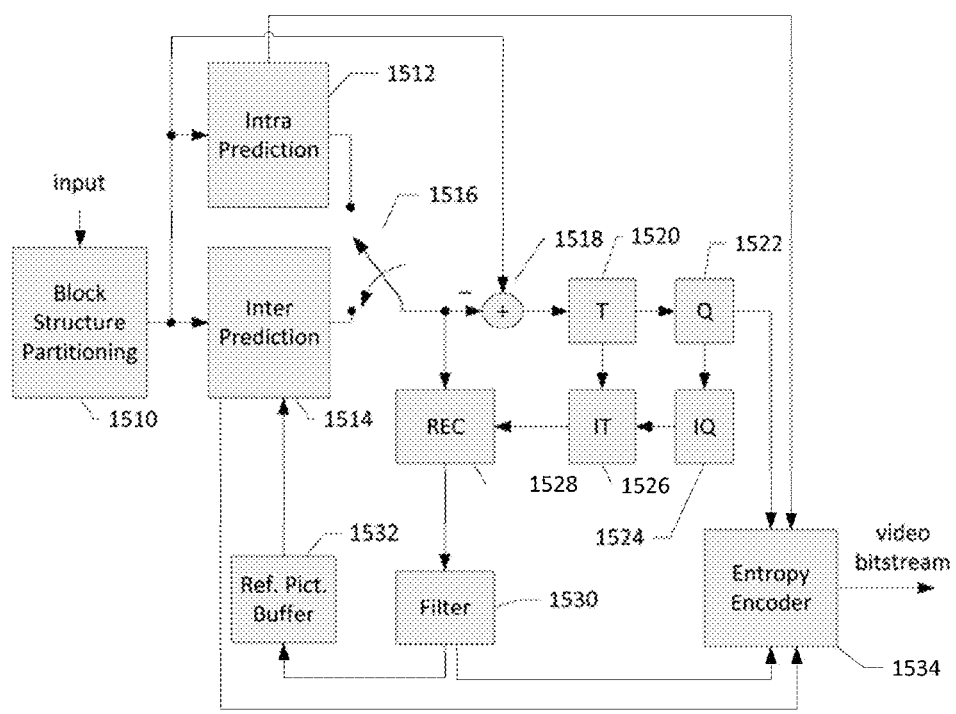
FIG. 15 illustrates an exemplary system block diagram for a video encoding system incorporating the video processing method according to embodiments of the present invention.

Exemplary System Block Diagram FIG. 15 illustrates an exemplary system block diagram for a Video Encoder 1500 implementing various embodiments of partitioning a current block with a partition constraint. A Block Structure Partitioning Module 1510 receives input data of video pictures and determines a block partitioning structure for each block in the video picture to be encoded. A current video picture is first divided into non-overlapped blocks and each block is further divided by a recursive partitioning structure into leaf blocks in the Block Structure Partitioning Module 1510, for example, the Block Structure Partitioning module adaptively partitions each of the non-overlapping CTUs in the current video picture into leaf CUs for prediction processing. According to various embodiments of the present invention, the Block Structure Partitioning Module 1510 receives input data associated with a current block in the current video picture and checks whether one or more predefined splitting types are allowed for partitioning the current block. The current block may be a current CTU, a CU split from the current CTU, or a TU. In some embodiments, a predefined splitting type is allowed if each sub-block split from the current block satisfies at least one of first and second constraints, where the first constraint restricts each sub-block to be completely contained in one pipeline unit and the second constraint restricts each sub-block to contain one or more complete pipeline units. The pipeline units are non-overlapping units in the current video picture designed for pipeline processing, and a pipeline unit size is predefined or implicitly defined based on a profile or level according to a video compression standard. For example, the pipeline unit size is set to a maximum Transform Block (TB) size. The Block Structure Partitioning Module 1510 adaptively partitions the current block using an allowed splitting type. The predefined splitting type is not allowed to split the current block if any sub-block partitioned by the predefined splitting type violates both the first and second constraints. Some other embodiments of the Block Structure Partitioning Module 1510 check if a predefined splitting type is allowed to partition the current block by comparing a width, a height, or both the width and height of the current block with one or both threshold W and threshold H. An example of the threshold W is 64 and an example of threshold H is also 64. If there are two or more allowed splitting types that can be used to partition the current block, an embodiment of the Block Structure Partitioning Module 1510 systematically tests the allowed splitting types and select the splitting type according to Rate Distortion Optimization (RDO) results. Information corresponds to the selected splitting type for the current block such as the block partitioning structure may be signaled in the video bitstream for the decoders to decode the current block. Each leaf block in the current video picture is predicted by Intra prediction in Intra Prediction Module 1512 or Inter prediction in Inter Prediction Module 1514 to remove spatial redundancy or temporal redundancy. Intra Prediction Module 1512 provides intra predictors for the current leaf block based on reconstructed video data of the current picture. Inter Prediction Module 1514 performs Motion Estimation (ME) and Motion Compensation (MC) to provide predictors for the current leaf block based on video data from other video picture or pictures. A Switch 1516 selects either Intra Prediction Module 1512 or Inter Prediction Module 1514 to supply the predictor to Adder 1518 to form prediction errors, also called residues. The residues of the current leaf block are further processed by Transform (T) Module 1520 followed by Quantization (Q) Module 1522. The transformed and quantized residual signal is then encoded by Entropy Encoder 1534 to form a video bitstream. The video bitstream is then packed with side information. The transformed and quantized residual signal of the current leaf block is processed by Inverse Quantization (IQ) Module 1524 and Inverse Transform (IT) Module 1526 to recover the prediction residues. As shown in FIG. 15, the residues are recovered by adding back to the selected predictor at Reconstruction (REC) Module 1528 to produce reconstructed video data. The reconstructed video data may be stored in Reference Picture Buffer (Ref. Pict. Buffer) 1532 and used by Inter Prediction Module 1514 for prediction of other pictures. The reconstructed video data from REC 1528 may be subject to various impairments due to the encoding processing, consequently, In-loop Processing Filter 1530 is applied to the reconstructed video data before storing in the Reference Picture Buffer 1532 to further enhance picture quality.

Figure 16:
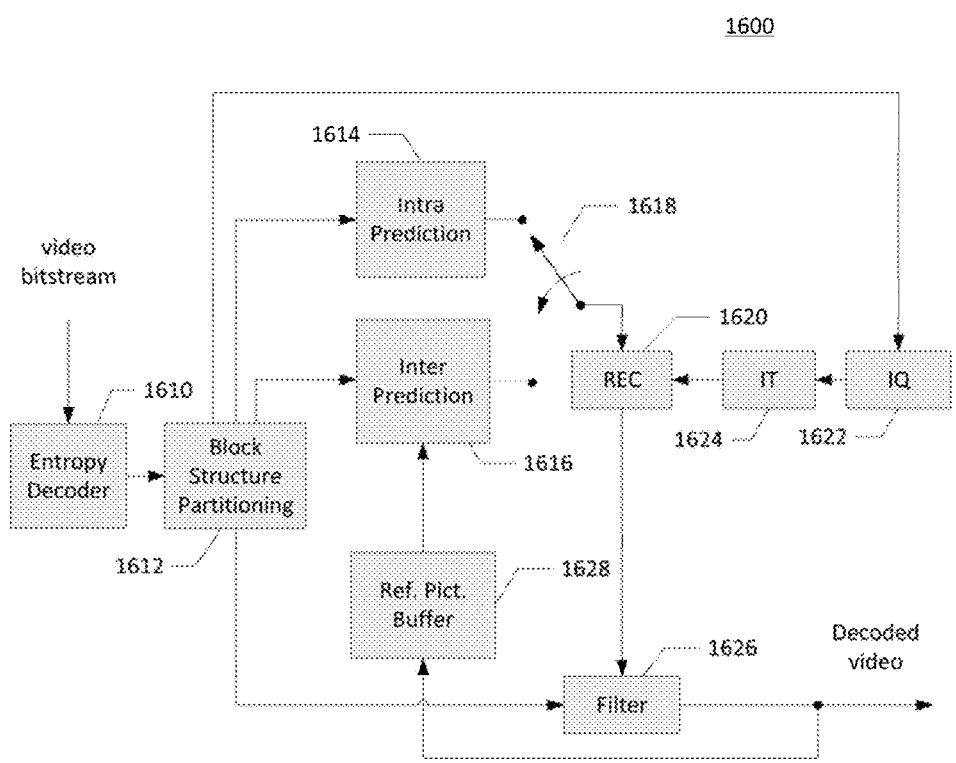
FIG. 16 illustrates an exemplary system block diagram for a video decoding system incorporating the video processing method according to embodiments of the present invention.

A corresponding Video Decoder 1600 for decoding the video bitstream generated by the Video Encoder 1500 of FIG. 15 is shown in FIG. 16. The input to the Video Decoder 1600 is decoded by Entropy Decoder 1610 to parse and recover the transformed and quantized residual signal and other system information. A Block Structure Partitioning Module 1612 determines a block partitioning structure of each block in each video picture according to various embodiments of the present invention. In some embodiments, a current block is not partitioned by a predefined splitting type if any sub-block partitioned by the predefined splitting type violates both first and second constraints. The first constraint restricts each of the sub-blocks partitioned from the current block by the predefined splitting type to be completely contained in one pipeline unit, and the second constraint restricts each of the sub-blocks to contain one or more complete pipeline unit. The pipeline units are non-overlapping units in the current video picture designed for pipeline processing, and the size of the pipeline units is predefined or implicitly determined. In some other embodiments of the Block Structure Partitioning Module 1612, the current block is not partitioned by a predefined splitting type according to a comparison result between a width, a height, or both the width and height of the current block and one or both threshold W and threshold H. The current block may be a CTU, a CU partitioned from the CTU, or a TU. The decoding process of the Decoder 1600 is similar to the reconstruction loop at the Encoder 1500, except the Decoder 1600 only requires motion compensation prediction in Inter Prediction Module 1616. Each leaf block is decoded by either Intra Prediction Module 1614 or Inter Prediction Module 1616, and a Switch 1618 selects an Intra predictor or Inter predictor according to decoded mode information. The transformed and quantized residual signal associated with each leaf block is recovered by Inverse Quantization (IQ) Module 1622 and Inverse Transform (IT) Module 1624.

The recovered residual signal is reconstructed by adding back the predictor in REC 1620 to produce reconstructed video. The reconstructed video is further processed by In-loop Processing Filter (Filter) 1626 to generate final decoded video. If a currently decoded video picture is a reference picture, the reconstructed video of the currently decoded video picture is also stored in Ref. Pict. Buffer 1628 for later pictures in decoding order.

Various components of the Video Encoder 1500 and Video Decoder 1600 in FIG. 15 and FIG. 16 may be implemented by hardware components, one or more processors configured to execute program instructions stored in a memory, or a combination of hardware and processor. For example, a processor executes program instructions to control receiving of input data associated with a current video picture. The processor is equipped with a single or multiple processing cores. In some examples, the processor executes program instructions to perform functions in some components in the Encoder 1500 and Decoder 1600, and the memory electrically coupled with the processor is used to store the program instructions, information corresponding to the reconstructed data, and/or intermediate data during the encoding or decoding process. The memory in some embodiments includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 15 and 16, the Encoder 1500 and Decoder 1600 may be implemented in the same electronic device, so various functional components of the Encoder 1500 and Decoder 1600 may be shared or reused if implemented in the same electronic device. Any of the embodiments of the present invention may be implemented in a Block Structure Partitioning Module 1510 of the Encoder 1500, and/or a Block Structure Partitioning Module 1612 of the Decoder 1600. Alternatively, any of the embodiments may be implemented as a circuit coupled to the Block Structure Partitioning Module 1510 of the Encoder 1500 and/or the Block Structure Partitioning Module 1612 of the Decoder 1600, so as to provide the information needed by the entropy decoder 1610 or the Block Structure Partitioning Module 1612.

The proposed video processing method with one or more partition constraints may be applied as a normative constraint for both encoders and decoders or may be applied as an encoder non-normative constraint. For an example of the normative constraint, if a particular splitting type or partitioning is not allowed, a partition syntax determining whether to select or split is not signaled and inferred as a fixed or derived value. For an example of the encoder non-normative constraint, if a particular splitting type or partitioning is not allowed, a partition syntax is still signaled to a corresponding decoder, but the value of the partition syntax is a fixed or derived value.

Embodiments of the video processing methods with one or more partition constraints may be implemented in a circuit integrated into a video compression chip or program code integrated into video compression software to perform the processing described above. For examples, determining of a block partitioning structure for the current block may be realized in program codes to be executed on a computer processor, a Digital Signal Processor (DSP), a microprocessor, or Field Programmable Gate Array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video processing in a video coding system for encoding or decoding video pictures with a partition constraint, the method comprising:
   receiving input data associated with a current block in a current video picture;
   determining two positive integers W and H as a pipeline unit size of pipeline units or a maximum transform size in a video compression standard, wherein the pipeline units are non-overlapping units in the current video picture and configured for pipeline processing;
   determining whether a predefined splitting type is allowed for partitioning the current block into multiple sub-blocks according to a partition constraint, wherein the partition constraint corresponds to a comparing result of a width of the current block, a height of the current block, or both the width and height of the current block with one or both W and H;
   based on the width of the current block being larger than W and the height of the current block being less than or equal to H, horizontal binary-tree splitting is not allowed, and
   based on the width of the current block being less than or equal to W and the height of the current block being larger than H, vertical binary-tree splitting is not allowed,
   partitioning the current block with one allowed splitting type, wherein the predefined splitting type is not used to partition the current block if the comparing result indicates the predefined splitting type is not allowed; and
   encoding or decoding the current block according to a block partitioning structure of the current block.

2. The method of claim 1, wherein W and H are predefined or implicitly defined based on a profile or level according to a video compression standard.

3. The method of claim 1, wherein ternary-tree splitting is not allowed if the width of the current block is larger than W, or the height of the current block is larger than H.

4. The method of claim 1, wherein horizontal ternary-tree splitting is not allowed if the width of the current block is larger than or equal to W and the height of the current block divide by 4 is smaller than H, and vertical ternary-tree splitting is not allowed if the height of the current block is larger than or equal to H and the width of the current block divide by 4 is smaller than W.

5. The method of claim 1, wherein horizontal ternary-tree splitting is not allowed if the width of the current block is larger than W and the height of the current block is larger than H but the height divide by 4 is smaller than H, and vertical ternary-tree splitting is not allowed if the height of the current block is larger than H and the width of the current block is larger than W but the width divide by 4 is smaller than W.

6. The method of claim 1, wherein horizontal ternary-tree splitting is not allowed if the width of the current block is larger than or equal to W and the height of the current block is larger than H but the height divide by 4 is smaller than H, and vertical ternary-tree splitting is not allowed if the height of the current block is larger than or equal to H and the width of the current block is larger than W but the width divide by 4 is smaller than W.

7. The method of claim 1, wherein horizontal ternary-tree splitting is not allowed if the width of the current block is larger than W and the height of the current block is larger than H and the height divide by 4 is not a multiple of H, and vertical ternary-tree splitting is not allowed if the height of the current block is larger than H and the width of the current block is larger than W but the width divide by 4 is not a multiple of W.

8. The method of claim 1, wherein at least a partition syntax is inferred according to the comparing result, and the partition syntax is not signaled in a video bitstream.

9. The method of claim 1, wherein a pipeline unit is defined to have a width equal to W and a height equal to H, a pipeline unit size is a product of W and H, the predefined splitting type is ternary-tree splitting, and the predefined splitting type is not allowed if a size of the current block is twice as large as the pipeline unit size.

10. The method of claim 1, wherein a pipeline unit is defined to have a width equal to W and a height equal to H, a pipeline unit size is a product of W and H, a size of the current block is twice as large as the pipeline unit size, and ternary-tree splitting is not allowed unless all further splitting directions are the same and a center sub-block of the current block is partitioned by binary-tree splitting.

11. The method of claim 1, wherein a pipeline unit is defined to have a width equal to W and a height equal to H, a pipeline unit size is a product of W and H, and the predefined splitting type is allowed if a size of the current block is four times as large as the pipeline unit size or if the size of the current block is smaller than the pipeline unit size, wherein the predefined splitting type is selected from quadtree, binary-tree, and ternary-tree splitting.

12. The method of claim 1, wherein a pipeline unit is defined to have a width equal to W and a height equal to H, determining whether a predefined splitting type is allowed for partitioning the current block further by considering a re-visit constraint, and the predefined splitting type is not allowed if the re-visit constraint is violated, wherein the re-visit constraint prohibits re-visiting any pipeline unit in the current block after leaving the pipeline unit when processing the sub-blocks partitioned from the current block.

13. An apparatus of video processing in a video coding system for encoding or decoding video pictures with a partition constraint, the apparatus comprising one or more electronic circuits configured to:
receive input data associated with a current block in a current video picture;
determine in a video compression standard a pipeline unit size of pipeline units or a maximum transform size in a video compression standard, wherein the pipeline units are non-overlapping units in the current video picture and configured for pipeline processing;
determine whether a predefined splitting type is allowed for partitioning the current block into multiple sub-blocks according to a partition constraint, wherein the partition constraint corresponds to a comparing result of a width of the current block, a height of the current block, or both the width and height of the current block with one or both W and H;
based on the width of the current block being larger than W and the height of the current block being less than or equal to H, horizontal binary-tree splitting is not allowed, and
based on the width of the current block being less than or equal to W and the height of the current block being larger than H, vertical binary-tree splitting is not allowed,
wherein the pipeline unit size W by H is set corresponding to a maximum transform block size in a video compression standard;
partition the current block with one allowed splitting type, wherein the predefined splitting type is not used to partition the current block if the comparing result indicates the predefined splitting type is not allowed; and
encode or decode the current block according to a block partitioning structure of the current block.

14. A non-transitory computer readable medium storing program instructions causing a processing circuit of an apparatus to encode or decode video pictures with a partition constraint, the instructions causing the processing circuit to:
receive input data associated with a current block in a current video picture;
determine two positive integers W and H as a pipeline unit size of pipeline units or a maximum transform size in a video compresson standard, wherein the pipeline units are non-overlapping units in the current video picture and configured for pipeline processing;
determine whether a predefined splitting type is allowed for partitioning the current block into multiple sub-blocks according to a partition constraint, wherein the partition constraint corresponds to a comparing result of a width of the current block, a height of the current block, or both the width and height of the current block with one or both W and H;
based on the width of the current block being larger than W and the height of the current block being less than or equal to H, horizontal binary-tree splitting is not allowed, and
based on the width of the current block being less than or equal to W and the height of the current block being larger than H, vertical binary-tree splitting is not allowed,
partition the current block with one allowed splitting type, wherein the predefined splitting type is not used to partition the current block if the comparing result indicates the predefined splitting type is not allowed; and
encode or decode the current block according to a block partitioning structure of the current block.

* * * * *